(12) United States Patent
Johta et al.

(10) Patent No.: US 9,637,159 B2
(45) Date of Patent: *May 2, 2017

(54) STEERING DEVICE

(71) Applicant: NSK LTD., Tokyo (JP)

(72) Inventors: Masaya Johta, Gunma (JP); Hideki Kojima, Gunma (JP); Wataru Hagiwara, Gunma (JP); Ryoichi Suzuki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/759,266

(22) PCT Filed: Oct. 17, 2014

(86) PCT No.: PCT/JP2014/077741
§ 371 (c)(1),
(2) Date: Jul. 6, 2015

(87) PCT Pub. No.: WO2015/064397
PCT Pub. Date: May 7, 2015

(65) Prior Publication Data
US 2016/0297464 A1 Oct. 13, 2016

(30) Foreign Application Priority Data

Oct. 30, 2013 (JP) ................................. 2013-225851
Dec. 17, 2013 (JP) ................................. 2013-260158
(Continued)

(51) Int. Cl.
*B62D 1/187* (2006.01)
*B62D 1/184* (2006.01)
(Continued)

(52) U.S. Cl.
CPC ............. *B62D 1/185* (2013.01); *B62D 1/184* (2013.01); *B62D 1/187* (2013.01); *B62D 1/195* (2013.01)

(58) Field of Classification Search
CPC ......... B62D 1/187; B62D 1/184; B62D 1/195
See application file for complete search history.

(56) References Cited

U.S. PATENT DOCUMENTS 6,467,807 B2 10/2002 Ikeda et al.
2009/0249916 A1 10/2009 Ridgway et al.
(Continued)

FOREIGN PATENT DOCUMENTS

CN 102119099 A 7/2011
CN 102656078 A 9/2012
(Continued)

OTHER PUBLICATIONS

International Search Report of PCT/JP2014/077741 dated Jan. 20, 2015 [PCT/ISA/210].
(Continued)

*Primary Examiner* — Faye M Fleming
(74) *Attorney, Agent, or Firm* — Sughrue Mion, PLLC

(57) ABSTRACT

A steering device which slides when an impulse load is applied. A steering device includes an inner column having a cylindrical shape and a first hole opened therein, an outer column having a cylindrical shape into which at least a part of the inner column is inserted and having a slit at one end thereof where the inner column is inserted, an outer column bracket to tighten the outer column along with a telescopic friction plate, an inner column bracket having a second hole opened therein and supported by the telescopic friction plate, a connection member that is a resinous member provided at a position straddling the first hole and the second hole and detachably connecting the inner column and the (Continued)

inner column bracket, and an inner plate that covers the inside of the first hole.

6 Claims, 25 Drawing Sheets

(30) Foreign Application Priority Data

May 8, 2014 (JP) .................................. 2014-096446
Jun. 16, 2014 (JP) .................................. 2014-123311

(51) Int. Cl.
    *B62D 1/185*     (2006.01)
    *B62D 1/19*     (2006.01)

(56) References Cited

U.S. PATENT DOCUMENTS

| | | | |
|---|---|---|---|
| 2012/0085194 A1 | 4/2012 | Inoue | |
| 2012/0267884 A1 | 10/2012 | Fujiwara et al. | |
| 2013/0213174 A1* | 8/2013 | Suzuki | B62D 1/187 74/493 |
| 2015/0239490 A1* | 8/2015 | Sakata | B62D 1/195 74/493 |
| 2015/0266495 A1* | 9/2015 | Yoshihara | B62D 1/195 74/493 |
| 2015/0266496 A1* | 9/2015 | Yoshihara | B62D 1/195 74/493 |
| 2015/0266497 A1* | 9/2015 | Yoshihara | B62D 1/184 74/493 |
| 2015/0353123 A1* | 12/2015 | Jyota | B62D 1/187 74/493 |

FOREIGN PATENT DOCUMENTS

| | | |
|---|---|---|
| EP | 1 762 462 A1 | 3/2007 |
| JP | 49-19234 Y1 | 5/1974 |
| JP | 2002-120731 A | 4/2002 |
| JP | 2002-160646 A | 6/2002 |
| JP | 2005-138758 A | 6/2005 |
| JP | 2007-069800 A | 3/2007 |
| JP | 2009-029152 A | 2/2009 |

OTHER PUBLICATIONS

Communication dated Dec. 28, 2016 from the State Intellectual Property Office of the P.R.C. in counterpart Application No. 201480046096.3.

* cited by examiner

STEERING DEVICE

CROSS REFERENCE TO RELATED APPLICATIONS

This application is a National Stage of International Application No. PCT/JP2014/077741, filed Oct. 17, 2014, claiming priorities based on Japanese Patent Application Nos. 2013-225851, filed Oct. 30, 2013, 2013-260158, filed Dec. 17, 2013, 2014-096446, filed May 8, 2014, 2014-123311, filed Jun. 16, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward the front side of the vehicle body, a part of the capsule is cut so that the steering column moves toward the front side of the vehicle body, and hence a driver (an operator) is protected from the upthrust (secondary collision) of the steering wheel. Meanwhile, Prior Art 2 discloses a structure in which a telescopic fixed member slides due to an impact load. In this structure, since the fixed member is inserted into a groove, there is a need to lengthen the groove in order to take a large contract amount. As a result, there is a tendency that the column increases in size.

PRIOR ART

Prior Art 1: Japanese Laid-open Patent Publication No. 2007-69800

Prior Art 2: Japanese Laid-open Patent Publication No. 2009-29152

As in the technique disclosed in Prior Art 1 in which the steering column is attached to the vehicle body through the capsule, the steering column is dropped when the capsule is cut. For this reason, when a setting value for a separation load in which the steering column moves toward the front side of the vehicle body is decreased in order to protect an operator having a light weight from the secondary collision, the steering column easily is dropped due to an erroneous operation. When the steering column is dropped due to the erroneous operation, it is difficult to perform the steering operation later. For this reason, it is difficult to decrease the setting value for the separation load.

The invention is made in view of the above-described circumstances, and an object of the invention is to provide a steering device capable of suppressing a problem in which a steering column is dropped by an erroneous operation is decreased even when a setting value of a separation load in which the steering column moves toward the front side of a vehicle body.

SUMMARY OF THE INVENTION

It is an object of the present invention to at least partially solve the problems in the conventional technology. According to an aspect of the invention, a steering device comprises an inner column having a cylindrical shape and a first hole opened therein, the inner column rotatably supporting an input shaft connected to a steering wheel; an outer column having a cylindrical shape into which at least a part of the inner column is inserted and having a slit at one end thereof where the inner column is inserted; an outer column bracket fixed to a vehicle body side member to support the outer column and to tighten the outer column along with a telescopic friction plate having a plate shape; an inner column bracket having a second hole opened therein, the inner column supported by the telescopic friction plate; a connection member that is a resinous member provided at a position straddling the first hole and the second hole and detachably connecting the inner column and the inner column bracket to each other; and an inner plate that is provided in an inner periphery surface of the inner column and covers the inside of the first hole.

Accordingly, in the steering device according to the invention, since the connection member, as the resinous member, is injected in a state where the inside of the first hole is covered by the inner plate, the inner column and the inner bracket are easily connected to each other. In the steering device according to the invention, when an excessive load is applied to the steering wheel, the load is transmitted to the inner column through the input shaft, and makes the inner column move forward. Meanwhile, the inner column bracket, which is supported by the telescopic friction plate, does not move. For this reason, since a shearing force is applied to the connection member, the connection member is cut when the load exceeds the allowable shearing force of the connection member. When the connection member is cut, the connection between the inner column and the inner column bracket is released. When the connection between the inner column and the inner column bracket is released, the inner column is supported in the axial direction by a friction force generated between the inner column and the outer column. For this reason, the inner column of the steering column can move toward the front side of the vehicle. Further, even when the connection member is cut, the outer column is supported by the outer column bracket which is fixed to the vehicle body side member. Further, the inner column is supported by the outer column. For this reason, even when the connection member is cut, the steering column does not drop. Thus, the steering device according to the invention suppress a problem in which the steering column drops by an erroneous operation, even when decreasing the setting value of the separation load in which the steering column moves toward the front side of the vehicle.

The inner plate includes a concave portion at a position facing the first hole, and the connection member is injected into the first hole, the second hole, and the concave portion. Accordingly, since the separation of the connection member solidified in the concave portion is prevented, the steering device according to the invention may suppress a problem in which the connection member comes off from the first hole and the second hole.

A connection member runner groove is provided outward from the concave portion. By the connection member runner groove, the connection member, which is injected once into the concave portion, remains in the concave portion and extends to every corner, and then the connection member runs outward from the outermost end of the concave portion by the injection pressure. Thus, the connection member extends to every corner of the concave portion, and hence the play of the inner plate disappears. Accordingly, it is possible to reliably suppress a problem in which the connection member comes off from the first hole and the second hole.

A checking hole is opened in the inner column. Since it is possible to visually check a state where the connection member is injected by the checking hole provided on the inner plate, it is possible to check whether the inner column and the inner column bracket are reliably connected to each other by the extrusion of the connection member.

The first hole and the concave portion are provided at a plurality of positions, and one concave portion faces one first hole. Accordingly, since the plurality of concave portions does not communicate with each other, a communication space of the second hole, the first hole, and the concave portion decreases comparatively. For this reason, since the injected connection member is facilely solidified, the steering device according to the invention connects the inner column bracket and the inner column to each other more reliably.

According to the invention, it is possible to provide a steering device capable of suppressing a problem in which a steering column is dropped by an erroneous operation even when a setting value of a separation load in which the steering column moves toward the front side of a vehicle body is decreased.

DETAILED DESCRIPTION OF THE PREFERRED EMBODIMENT

A mode (an embodiment) for carrying out the invention will be described in detail with reference to the drawings. The invention is not limited to the content described in the embodiments below. Further, components described below include a component which is easily supposed by the person skilled in the art and a component which has substantially the same configuration. Further, the components described below may be appropriately combined with one another.

First to Fourth Embodiments

Figure 1:
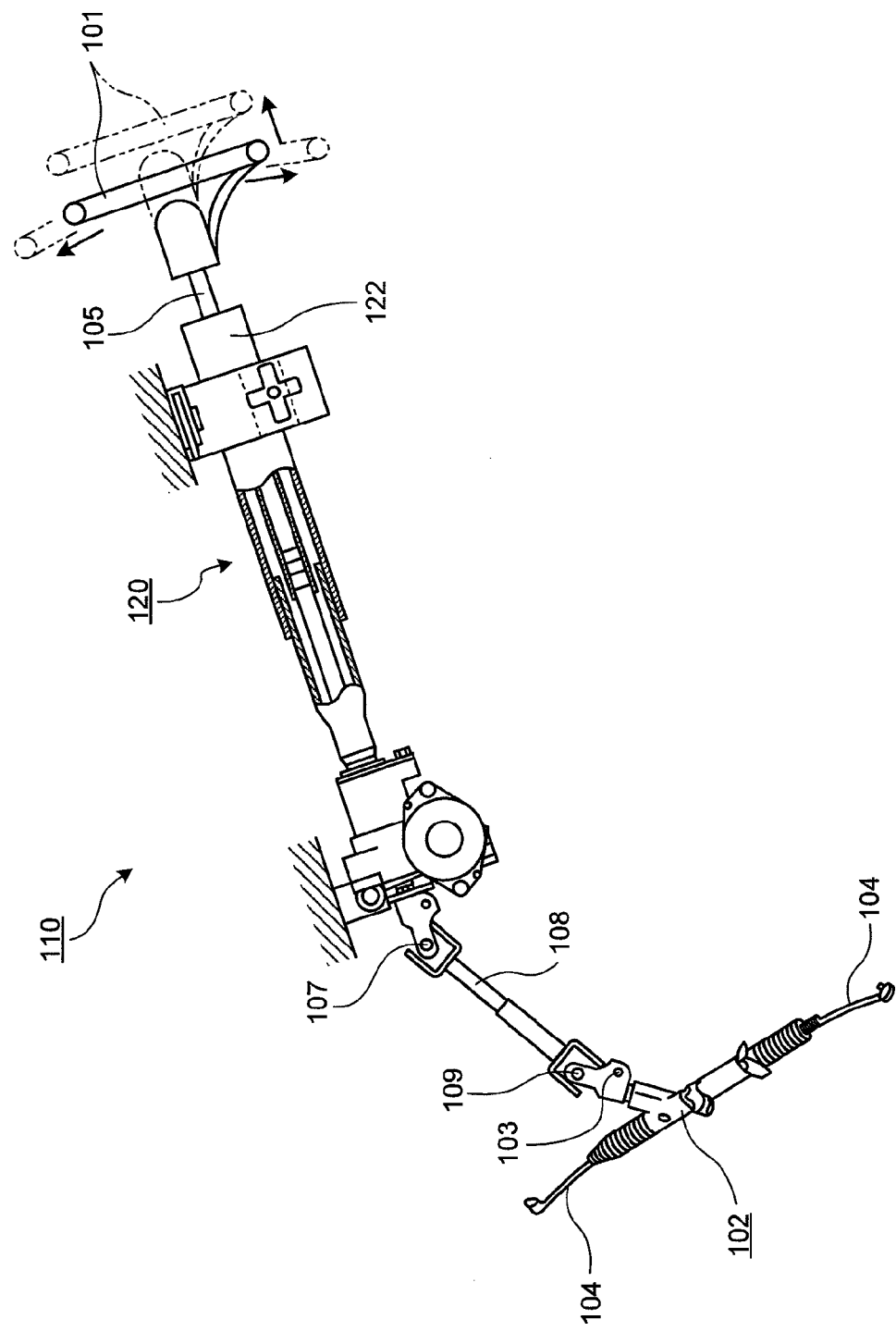
FIG. 1 is a schematic diagram illustrating an entire steering device of first to fourth embodiments.
Figure 2:
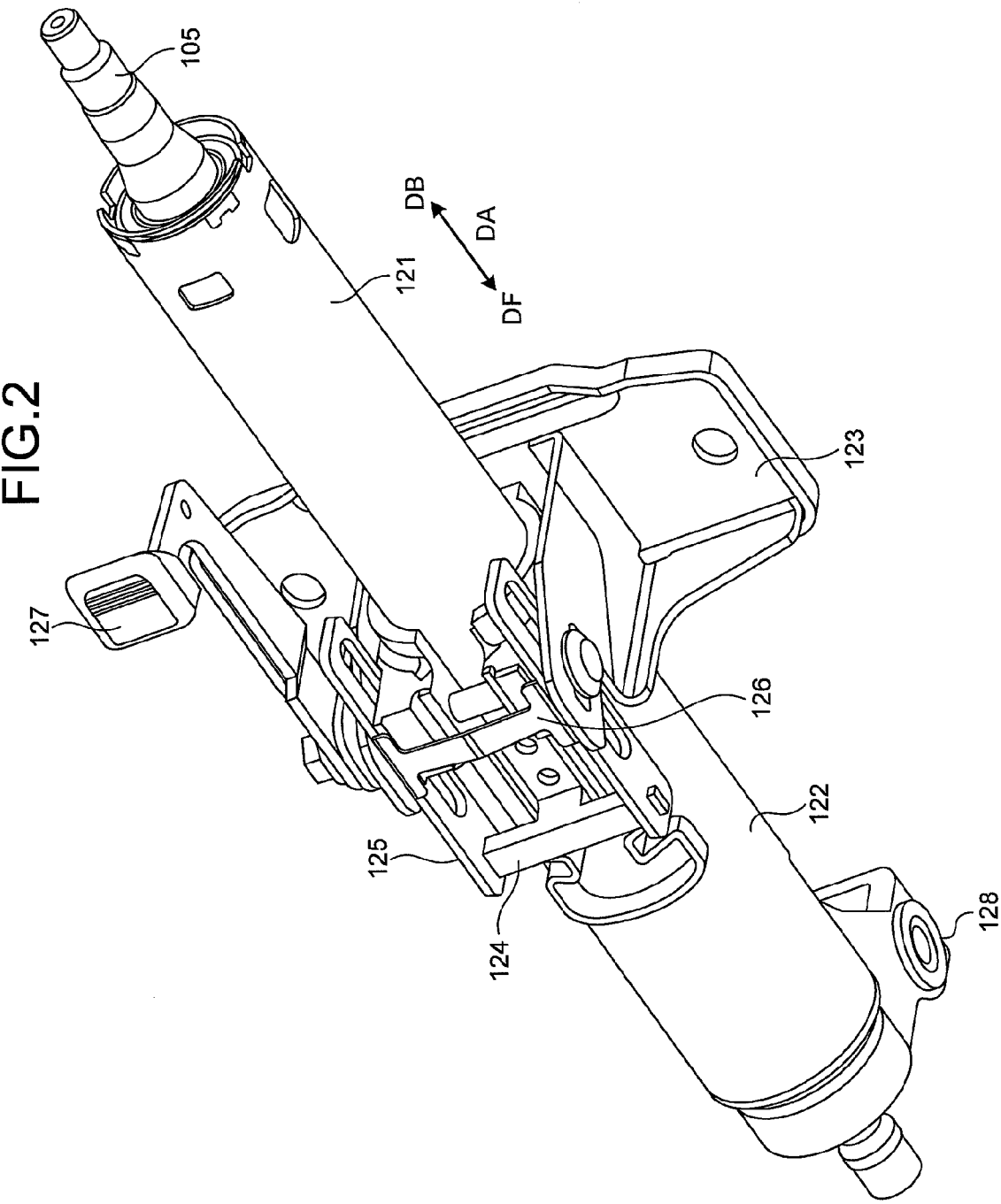
FIG. 2 is a perspective view illustrating a steering column apparatus of the steering device of the first to fourth embodiments.
Figure 3:
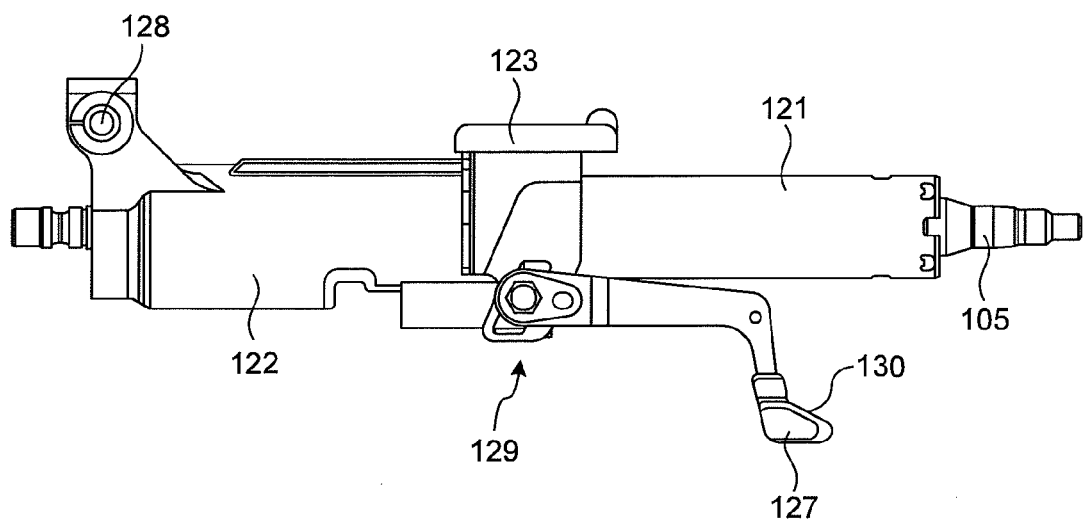
FIG. 3 is a diagram illustrating a side surface of the steering column apparatus according to the first to fourth embodiments.
Figure 4:
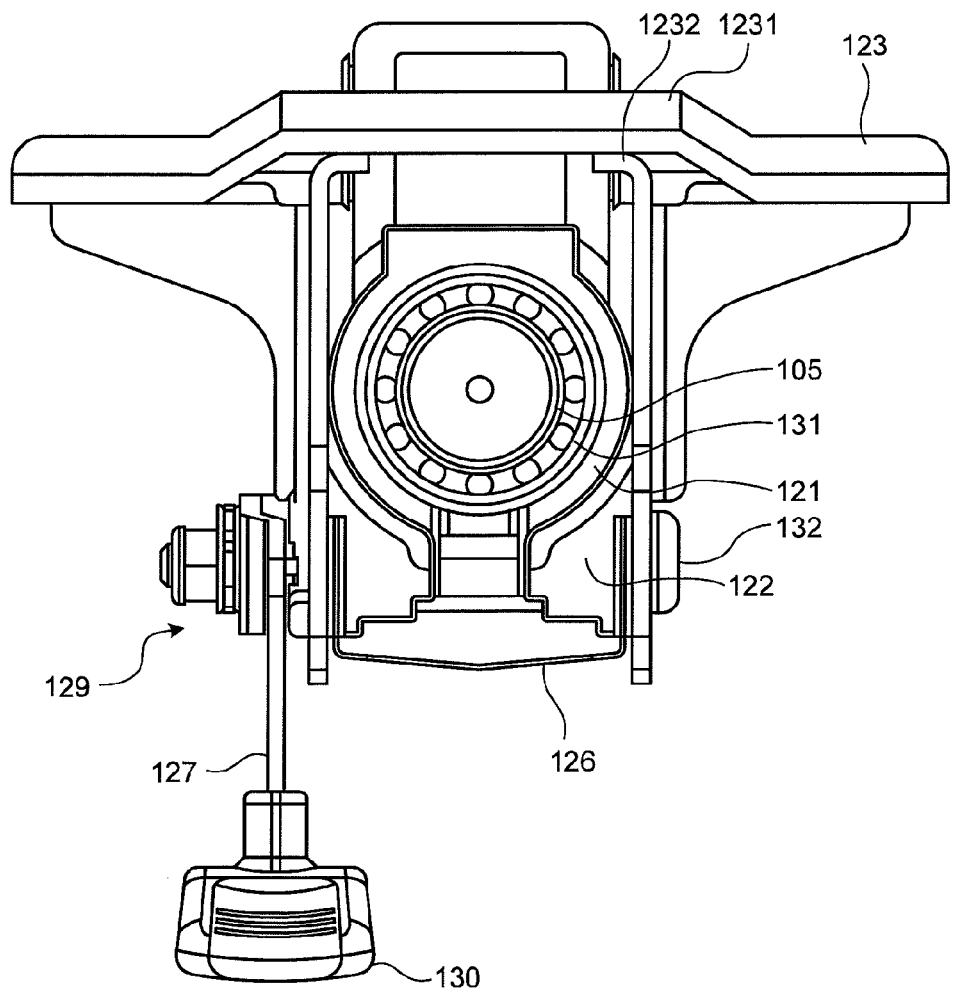
FIG. 4 is a diagram illustrating a front surface (at the rear side) of the steering column apparatus according to the first to fourth embodiments.
Figure 5:
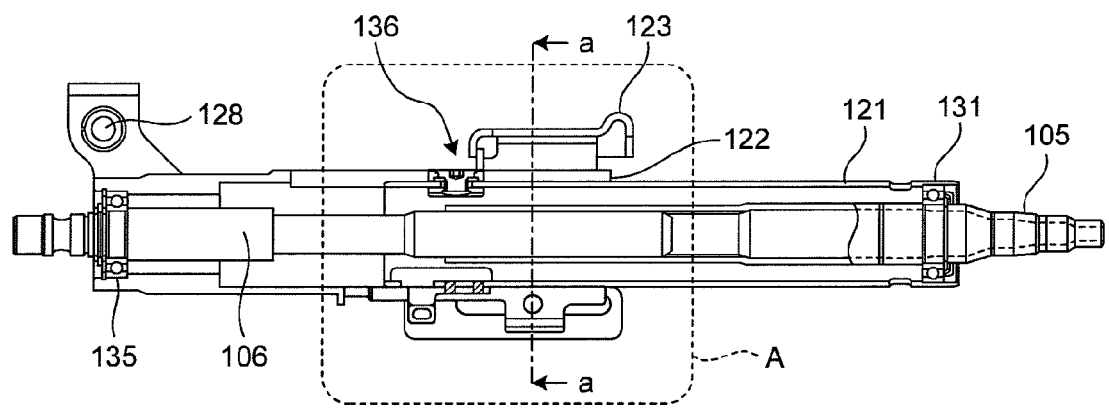
FIG. 5 is a diagram illustrating a side surface (a part of a cross section) of the steering column apparatus according to the first embodiment.
Figure 6:
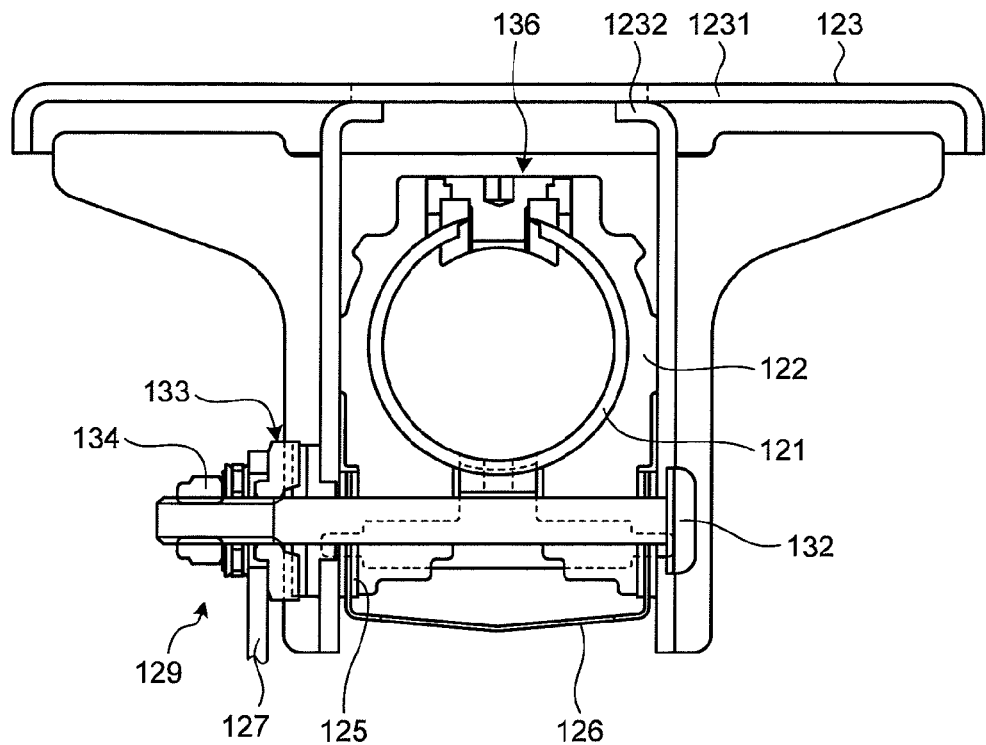
FIG. 6 is a cross-sectional view taken along the line a-a of FIG. 5.
Figure 7:
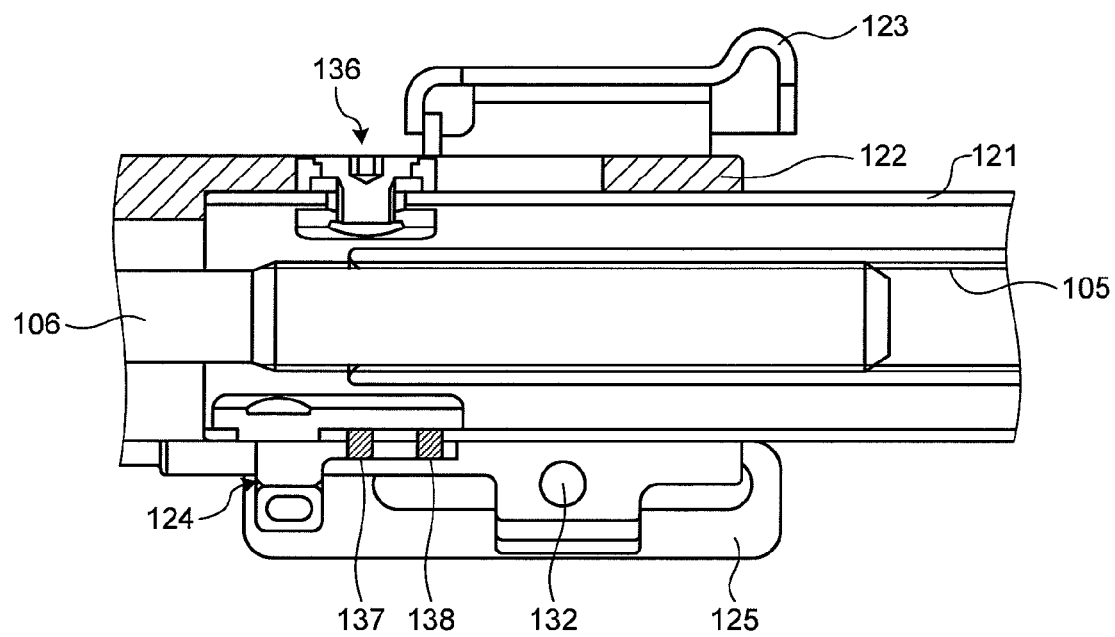
FIG. 7 is an enlarged diagram illustrating a part A of FIG. 5.
Figure 8:
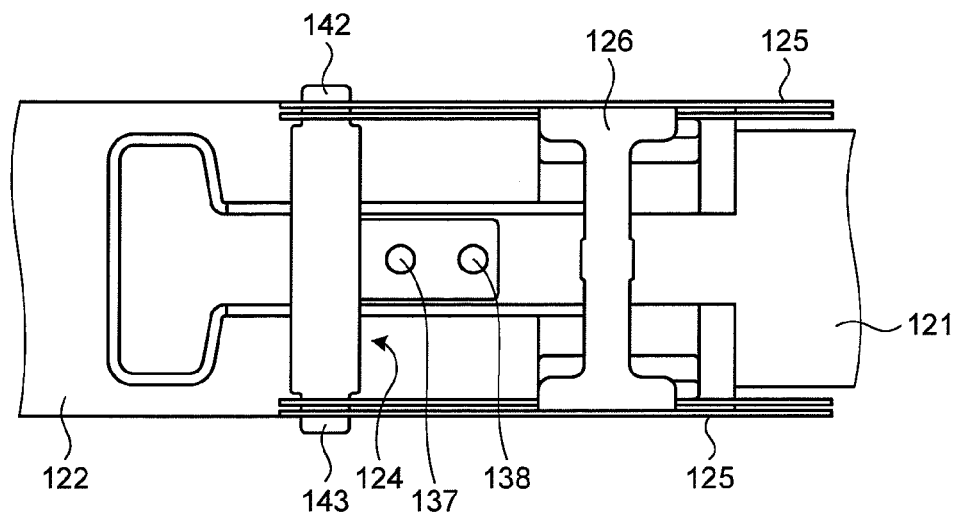
FIG. 8 is a diagram (a bottom view of the steering column apparatus) illustrating a bottom surface of FIG. 7.
Figure 9:
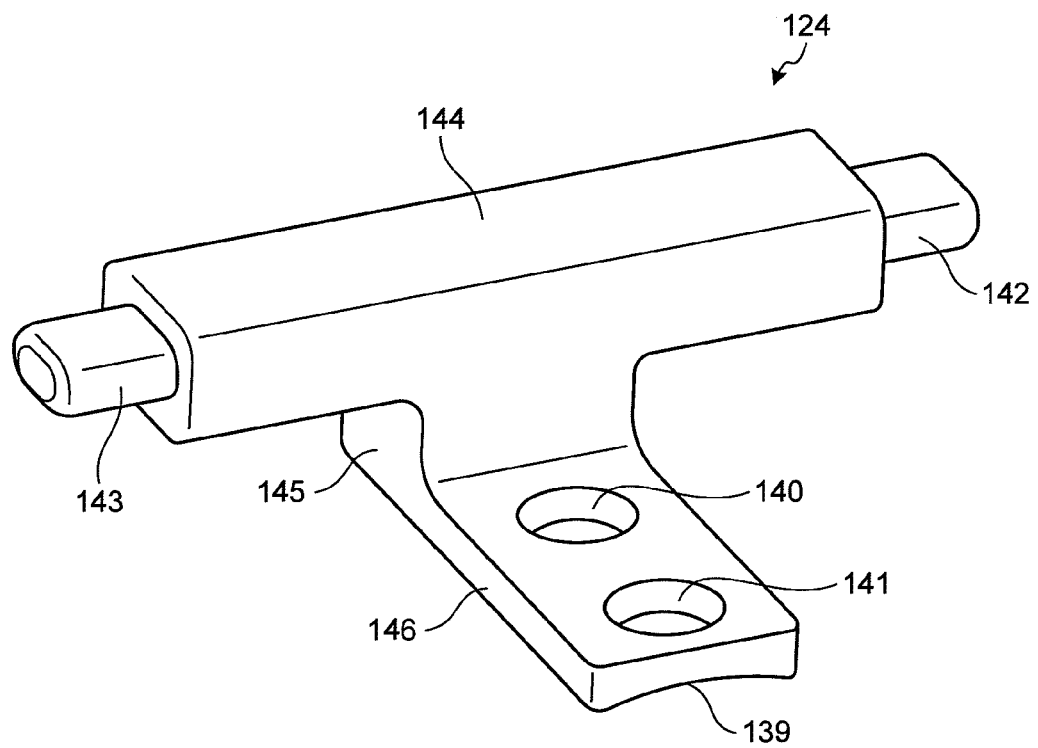
FIG. 9 is a perspective view illustrating a fixed bracket according to the first embodiment.
Figure 10:
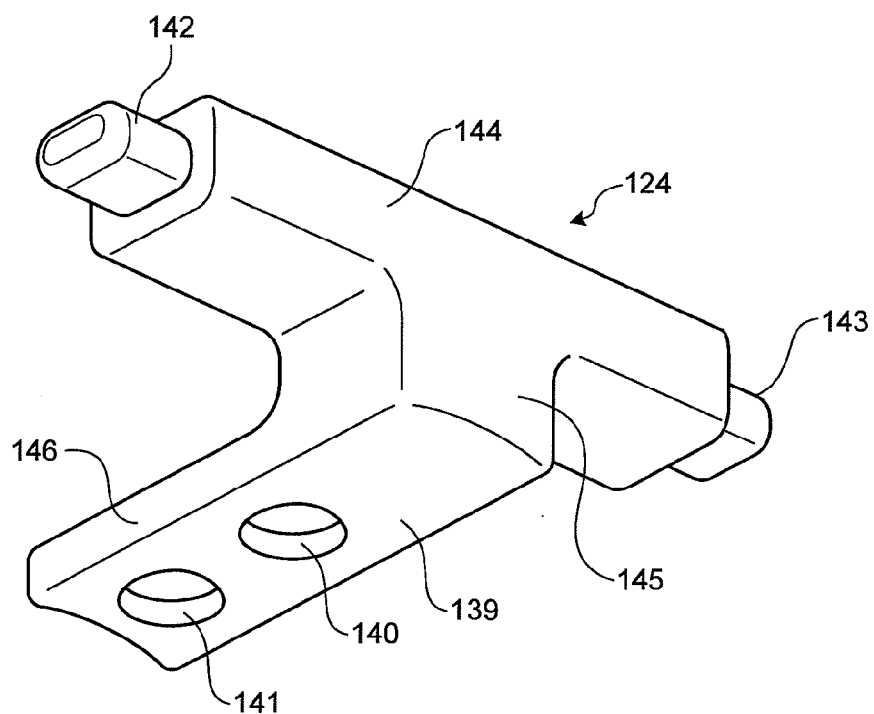
FIG. 10 is a perspective view illustrating the fixed bracket according to the first embodiment.
Figure 11:
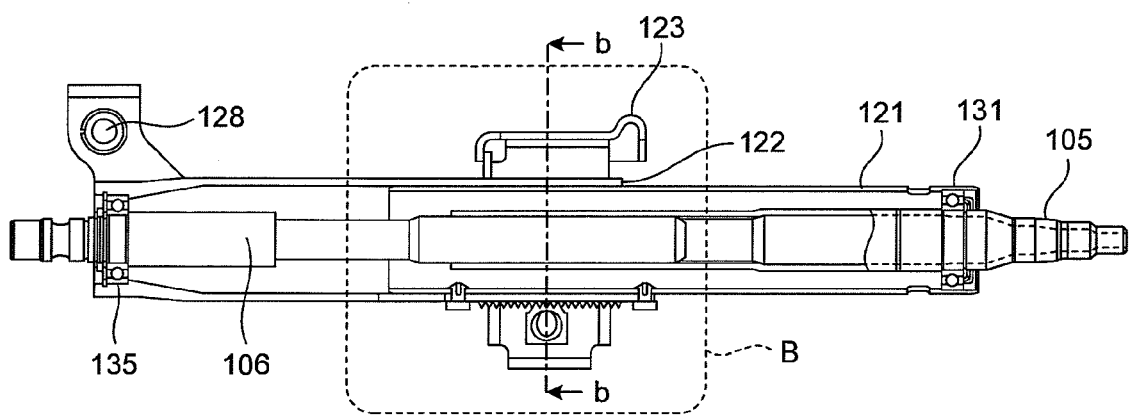
FIG. 11 is a diagram illustrating a side surface (a part of a cross section) of the steering column apparatus of the second embodiment.
Figure 12:
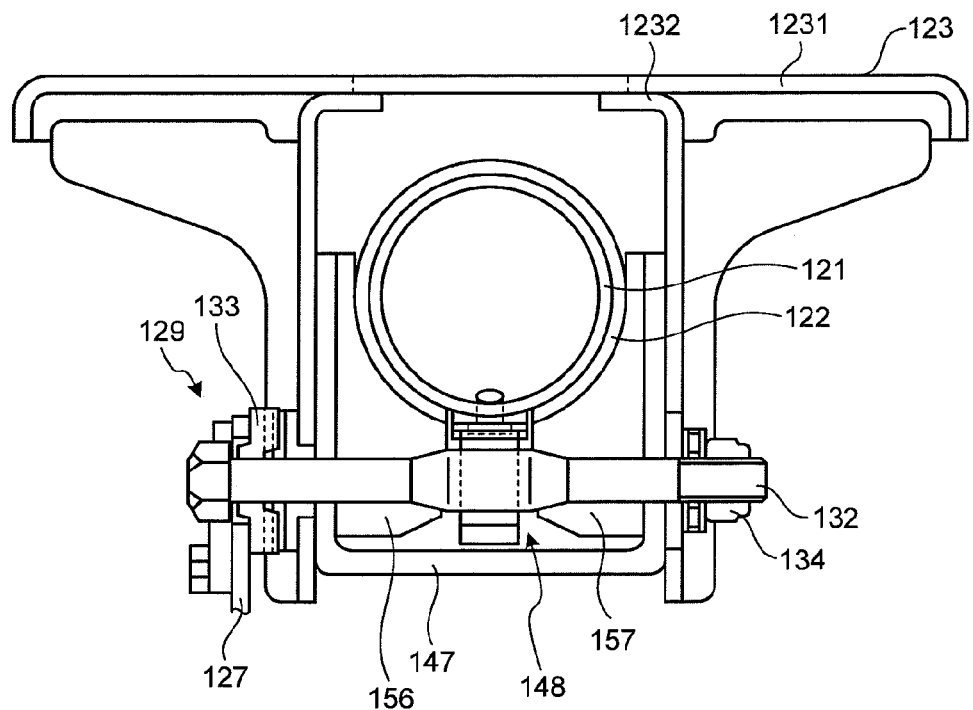
FIG. 12 is a cross-sectional view taken along the line b-b of FIG. 11.
Figure 13:
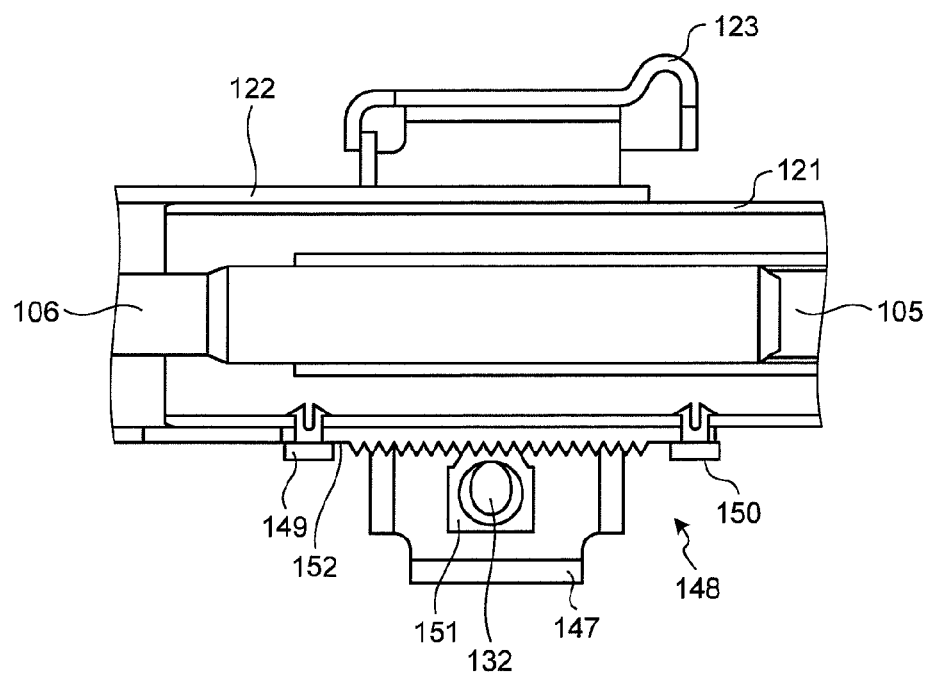
FIG. 13 is an enlarged diagram illustrating a part B of FIG. 11.
Figure 14:
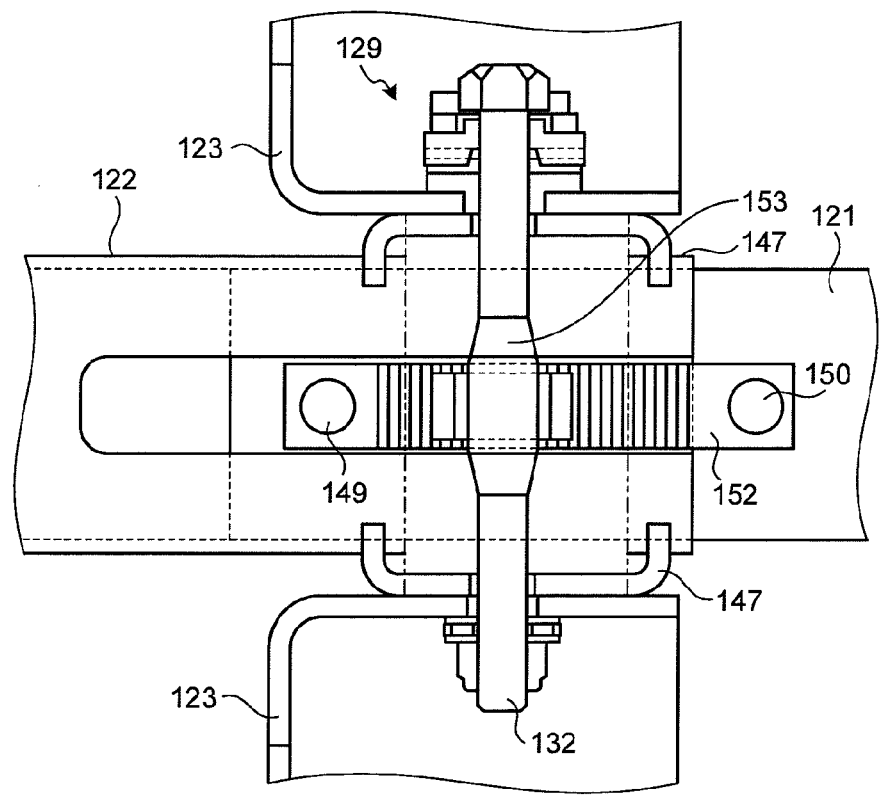
FIG. 14 is a diagram (a bottom view of the steering column apparatus) illustrating a bottom surface of FIG. 11.
Figure 15:
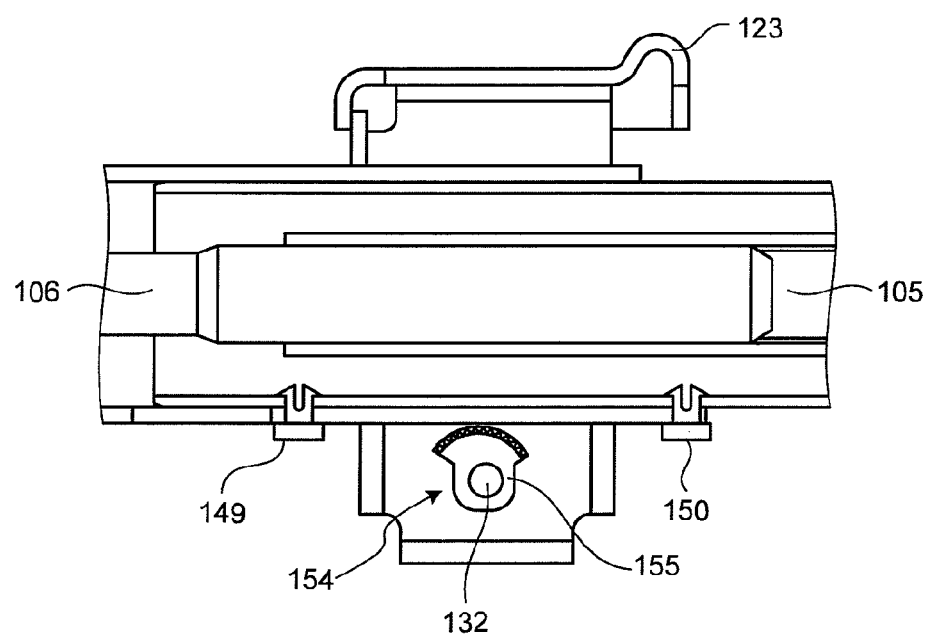
FIG. 15 is a diagram similar to FIG. 13 illustrating a modified example of the second embodiment.
Figure 16:
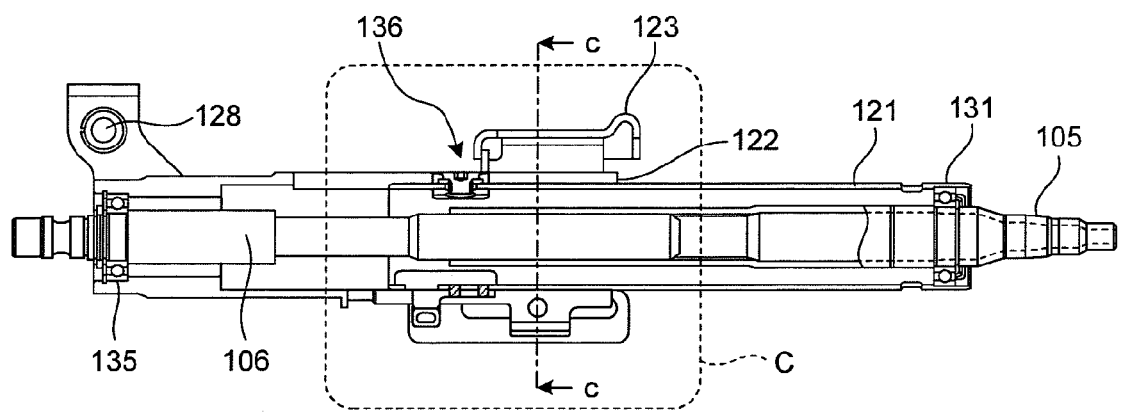
FIG. 16 is a diagram illustrating a side surface (a part of a cross section) of the steering column apparatus of the third embodiment.
Figure 17:
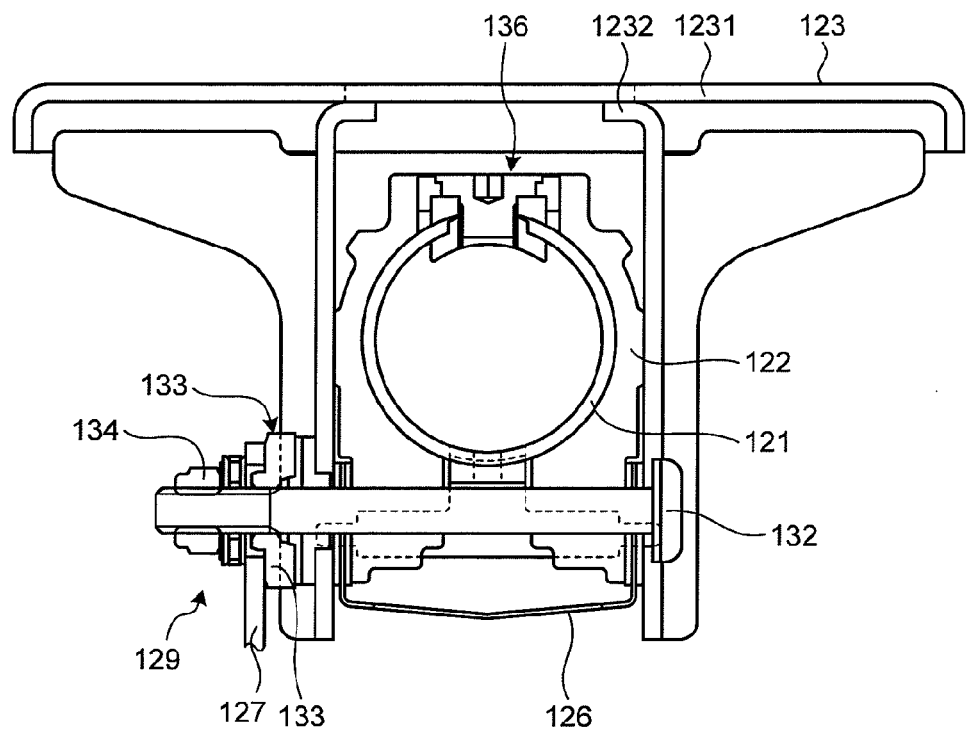
FIG. 17 is a cross-sectional view taken along the line c-c of FIG. 16.
Figure 18:
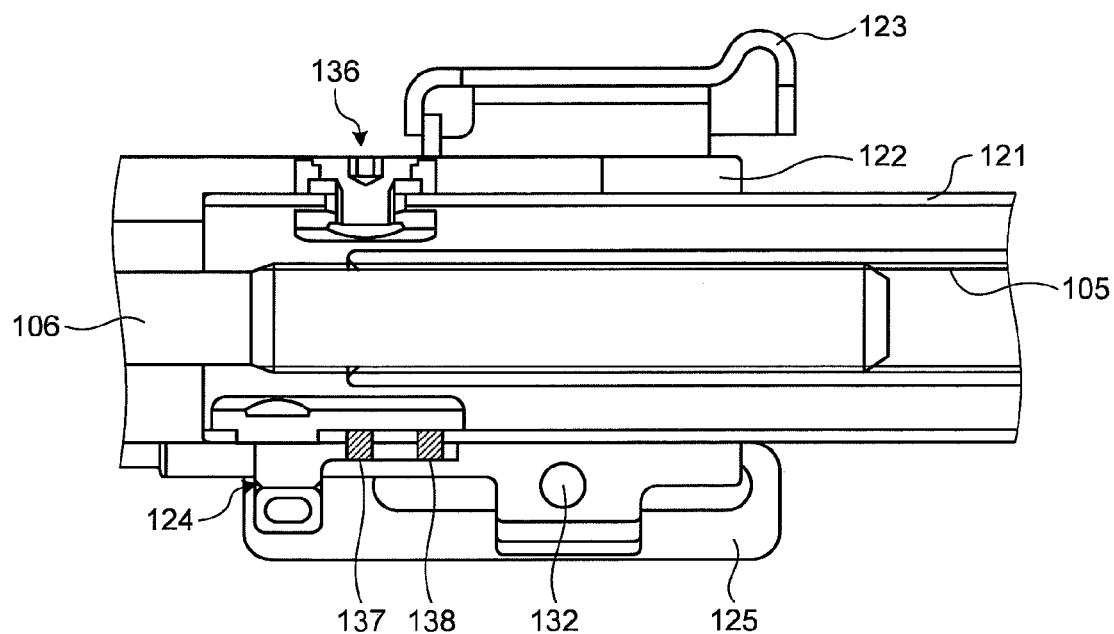
FIG. 18 is an enlarged diagram illustrating a part C of FIG. 16.
Figure 19:
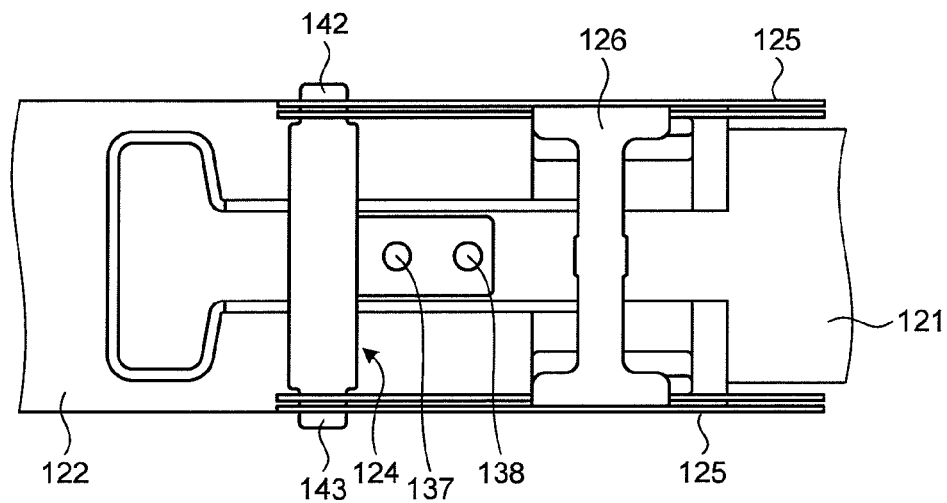
FIG. 19 is a diagram (a bottom view of the steering column apparatus) illustrating a bottom surface of FIG. 16.
Figure 20A:
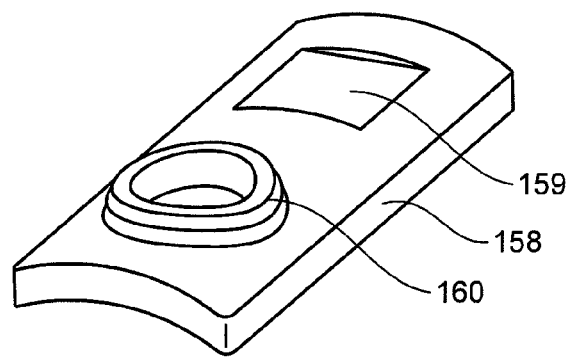
FIGS. 20A and 20B are diagrams illustrating an inner plate according to the third embodiment.
Figure 20B:
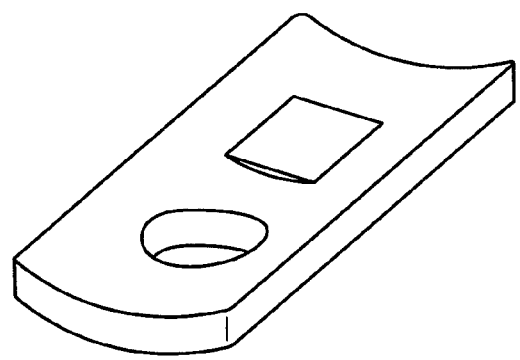
Figure 21A:
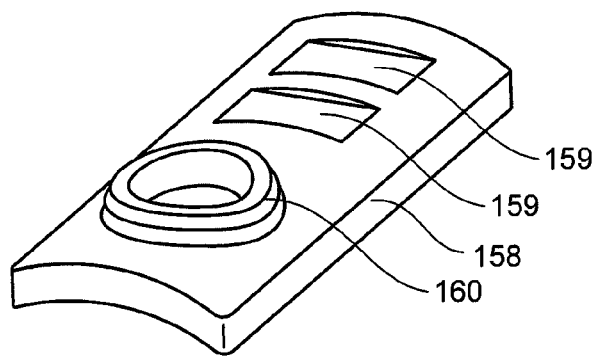
FIGS. 21A and 21B are diagrams illustrating an inner plate according to a modified example of the third embodiment.
Figure 21B:
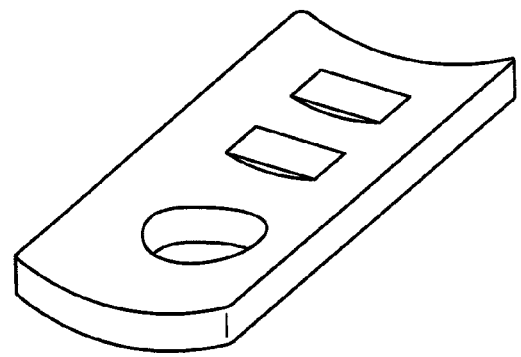
Figure 22:
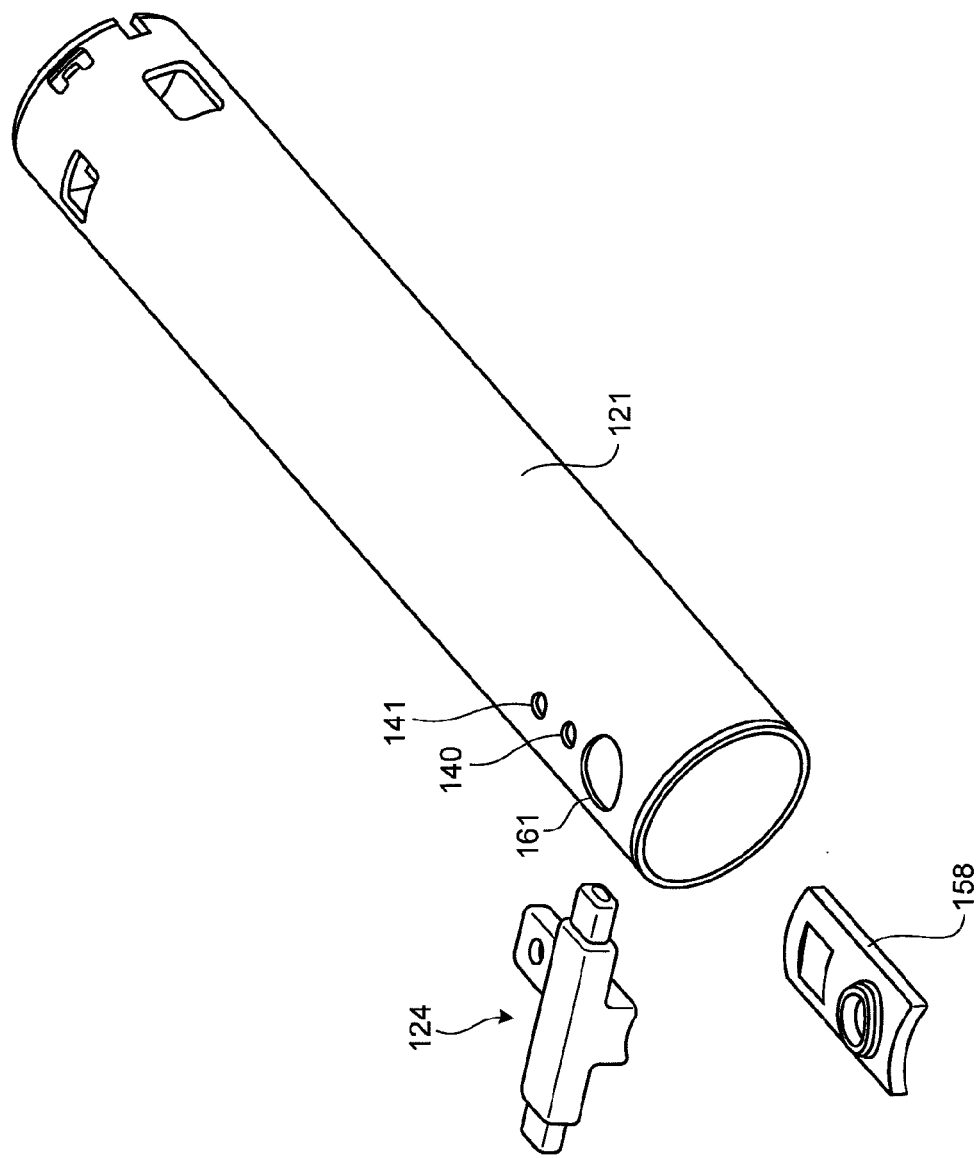
FIG. 22 is a diagram illustrating an inner plate attachment method according to the third embodiment.
Figure 23A:
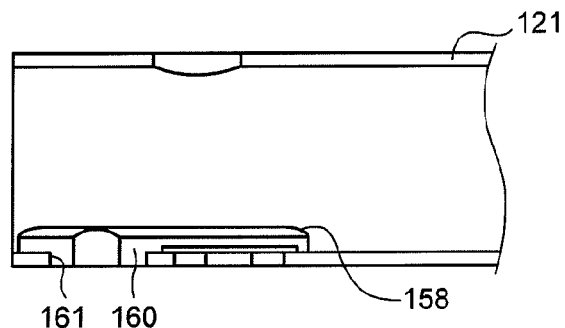
FIGS. 23A to 23D are diagrams illustrating an inner plate attachment method according to the third embodiment.
Figure 23B:
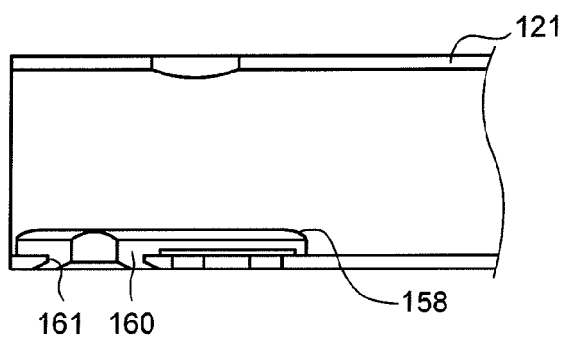
Figure 23C:
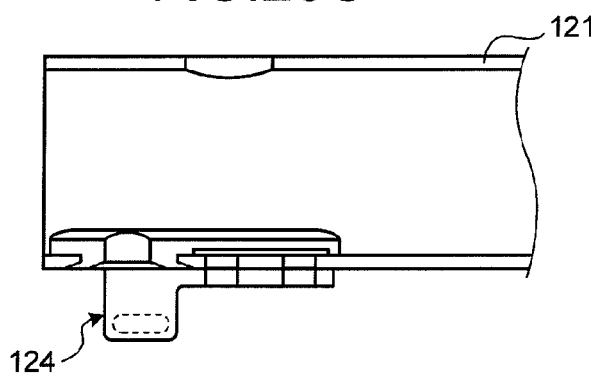
Figure 23D:
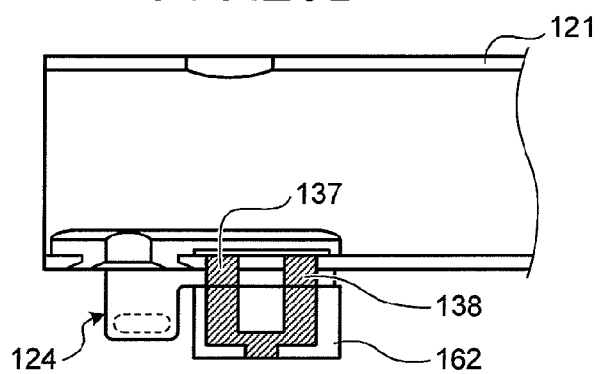

Hereinafter, this structure will be described in detail with reference to FIGS. 1 to 23. FIGS. 1 to 4 schematically illustrate the first to fourth embodiments. FIGS. 5 to 10 specifically illustrate the structure of the first embodiment. Similarly, FIGS. 11 to 15 specifically illustrate the structure of the second embodiment, and FIGS. 16 to 23 specifically illustrate the structure of the third embodiment. In FIG. 2, the axial direction DA indicates the axial direction of the steering shaft, and the front side DF and the rear side DB indicate the front side and the rear side of the vehicle body when the steering device is attached to the vehicle body.

The first embodiment relates to a steering column apparatus 120 that supports a steering shaft including a male steering shaft 106 and a female steering shaft 105. Here, a steering column includes an inner column 121 and an outer column 122 and contracts in the axial direction so as to be adjusted in a telescopic manner and to absorb impact. The steering column apparatus 120 is tilted through a tilt bracket 123 attached to a vehicle body. Then, the outer column 122 is tightened by a tightening mechanism 129 provided in the tilt bracket 123 so as to hold the inner column 121. Here, a telescopic multi-plate 125 is provided so as to increase the friction surface of the tightening mechanism 129. Further, the telescopic multi-plate 125 is fixed to a fixed bracket 124 provided in a slit of the outer column 122 at the bottom surface side of the column (121, 122), and a shear pin is inserted through a hole of the inner column 121 and a hole of the fixed bracket 124 while the holes match each other, thereby supporting the inner column 121 so as to be detachable from the fixed bracket 124.

The second embodiment relates to the steering column apparatus 120 that supports the steering shaft including the male steering shaft 106 and the female steering shaft 105. Here, the steering column apparatus 120 includes the inner column 121 and the outer column 122 and contracts in the axial direction so as to be operated in a telescopic manner and to absorb impact. The steering column apparatus 120 is attached to the vehicle body so as to be tilted through the tilt bracket 123 attached to the vehicle body. Further, the tilt bracket 123 includes the tightening mechanism 129 which holds the inner column 121 by tightening the outer column 122. The outer column 122 includes a slit, and the inner column 121 is gripped by a pressing bracket 1232 which presses the inner column by the action of the tightening mechanism 129 in the right and left direction of the slit. Furthermore, a cam and gear mechanism 148, which functions as a fixed plate detachably attached to the inner column 121, is disposed in the slit, and the tightening mechanism 129 is provided which presses a cam portion provided in a tilt bolt center portion 153 in a direction from the downside of the fixed plate toward the upside thereof by rotating a cam lock mechanism 133 as a cam at the center of a tilt lever 127 with the rotation of the tilt lever constituting the tightening mechanism.

The third embodiment relates to a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multi-plate as a friction plate are tightened by a tightening mechanism so as to hold the inner column fitted into the outer column. Further, the outer column includes a slit, and the inner column is gripped by a pressing bracket which presses the inner column in the right and left direction of the slit in the tightening mechanism. Furthermore, an inner plate 158 which is a fixed plate as a friction plate detachably attached to the inner column is disposed in the slit, and the fixed bracket which fixes the friction plate is coupled and fixed to the inner column by shear pins 137 and 138 formed by an injection-molding process.

The fourth embodiment relates to a steering device that includes the steering column apparatus according to any one of the first to third embodiments.

The steering device of the fourth embodiment may be appropriately used as a vehicle steering device.

Fifth Embodiment

Figure 24:
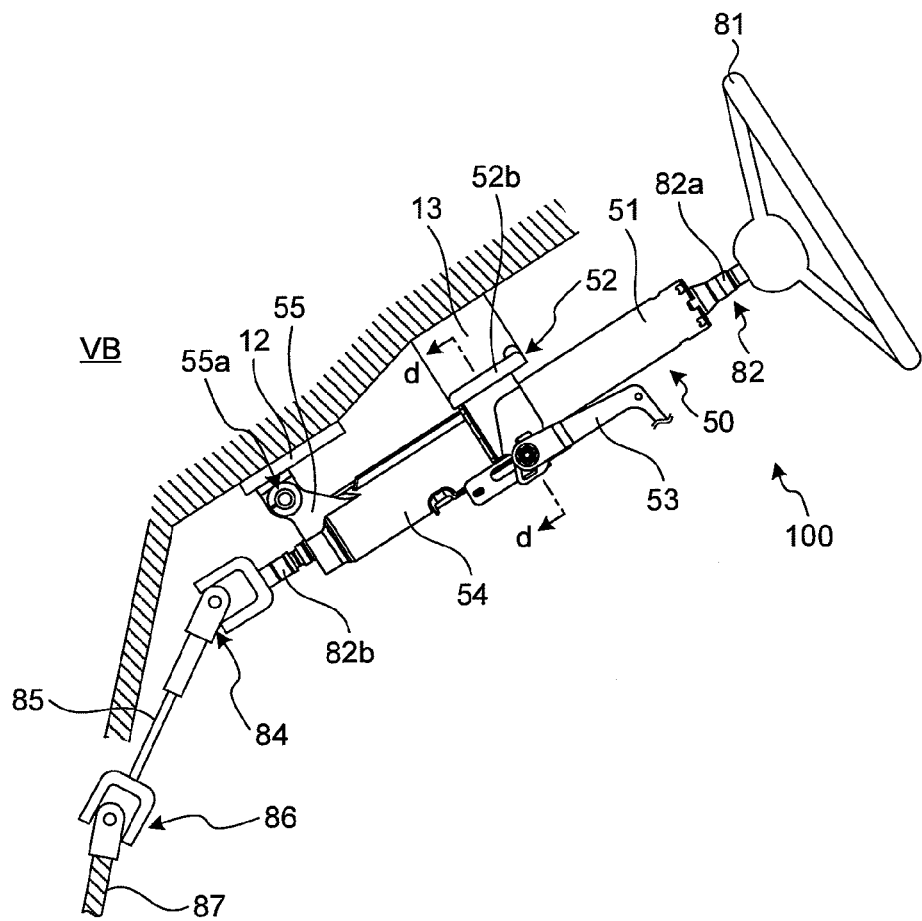
FIG. 24 is a schematic diagram illustrating the periphery of a steering device according to a fifth embodiment.
Figure 25:
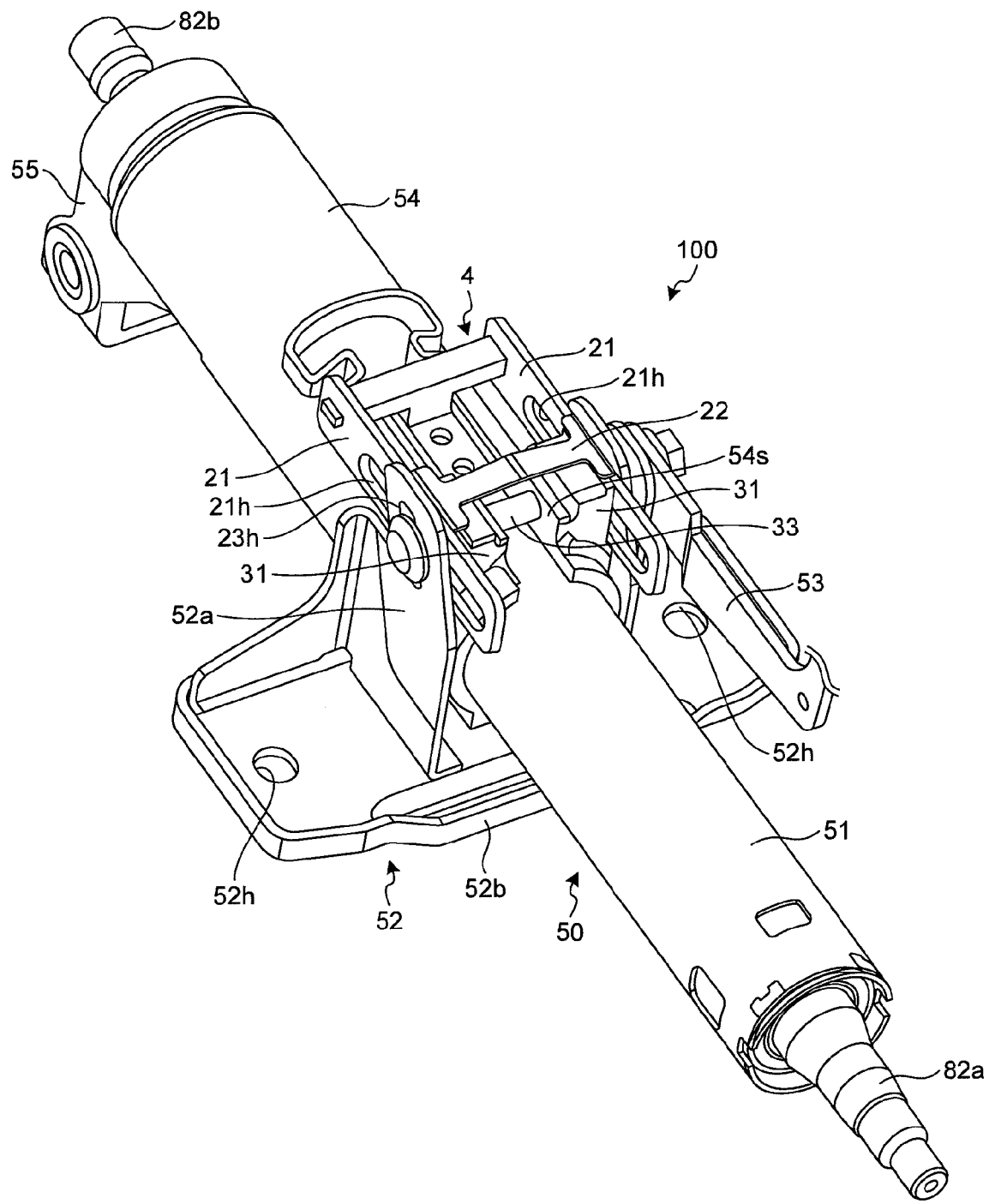
FIG. 25 is a perspective view illustrating the steering device according to the fifth embodiment when viewed from a bottom surface thereof.

FIG. 24 is a schematic diagram illustrating the periphery of a steering device according to a fifth embodiment. FIG. 25 is a perspective view illustrating the steering device according to the fifth embodiment when viewed from the bottom surface thereof. Referring to FIGS. 24 and 25, an outline of the steering device according to the fifth embodiment will be described. Further, in the description below, the front side of a vehicle body VB when a steering device 100 is attached to the vehicle body VB will be simply referred to as the front side and the rear side of the vehicle body VB when the steering device 100 is attached to the vehicle body VB will be simply referred to as the rear side. In FIG. 24, the front side indicates the left side of the drawing, and the rear side indicates the right side of the drawing.

(Steering Device)

The steering device 100 includes a steering wheel 81, a steering shaft 82, a universal joint 84, a lower shaft 85, and a universal joint 86 in order in which a force is transmitted from an operator, and is coupled to a pinion shaft 87.

The steering shaft 82 includes an input shaft 82a and an output shaft 82b. In the input shaft 82a, one end is connected to the steering wheel 81 and the other end is connected to the output shaft 82b. In the output shaft 82b, one end is connected to the input shaft 82a and the other end is connected to the universal joint 84. In the fifth embodiment, the input shaft 82a and the output shaft 82b are formed of general steel such as SPCC (Steel Plate Cold Commercial).

In the lower shaft 85, one end is connected to the universal joint 84 and the other end is connected to the universal joint 86. In the pinion shaft 87, one end is connected to the universal joint 86.

Further, the steering device 100 includes a steering column 50 including a cylindrical inner column 51 that rotatably supports the input shaft 82a and a cylindrical outer column 54 into which at least a part of the inner column 51 is inserted. The inner column 51 is disposed at the rear side of the outer column 54. In the description below, the axial direction of the inner column 51 and the axial direction of the outer column 54 will be simply referred to as the axial direction.

The steering device 100 includes an outer column bracket 52 which is fixed to a vehicle body side member 13 and supports the outer column 54. The outer column bracket 52 includes an attachment plate portion 52b which is fixed to the vehicle body side member 13 and a frame-shaped support portion 52a which is integrated with the attachment plate portion 52b. The attachment plate portion 52b of the outer column bracket 52 includes, for example, an attachment hole 52h, and is fixed to the vehicle body side member 13 by a fixing member such as a bolt and the attachment hole 52h. The frame-shaped support portion 52a of the outer column bracket 52 is disposed at both sides of the outer column 54 so as to tighten the outer column 54. Further, the frame-shaped support portion 52a is provided with a tilt adjustment hole 23h as an elongated hole which is long in the up and down direction of the vehicle body VB.

Further, the outer column 54 includes a pivot bracket 55 which is provided at the front end. The pivot bracket 55 is supported by a vehicle body side member 12 so as to be rotatable about a center of a rotation shaft 55a. The rotation shaft 55a is parallel to, for example, the horizontal direction. Accordingly, the outer column 54 is supported so as to be tilted in the vertical direction.

Figure 26:
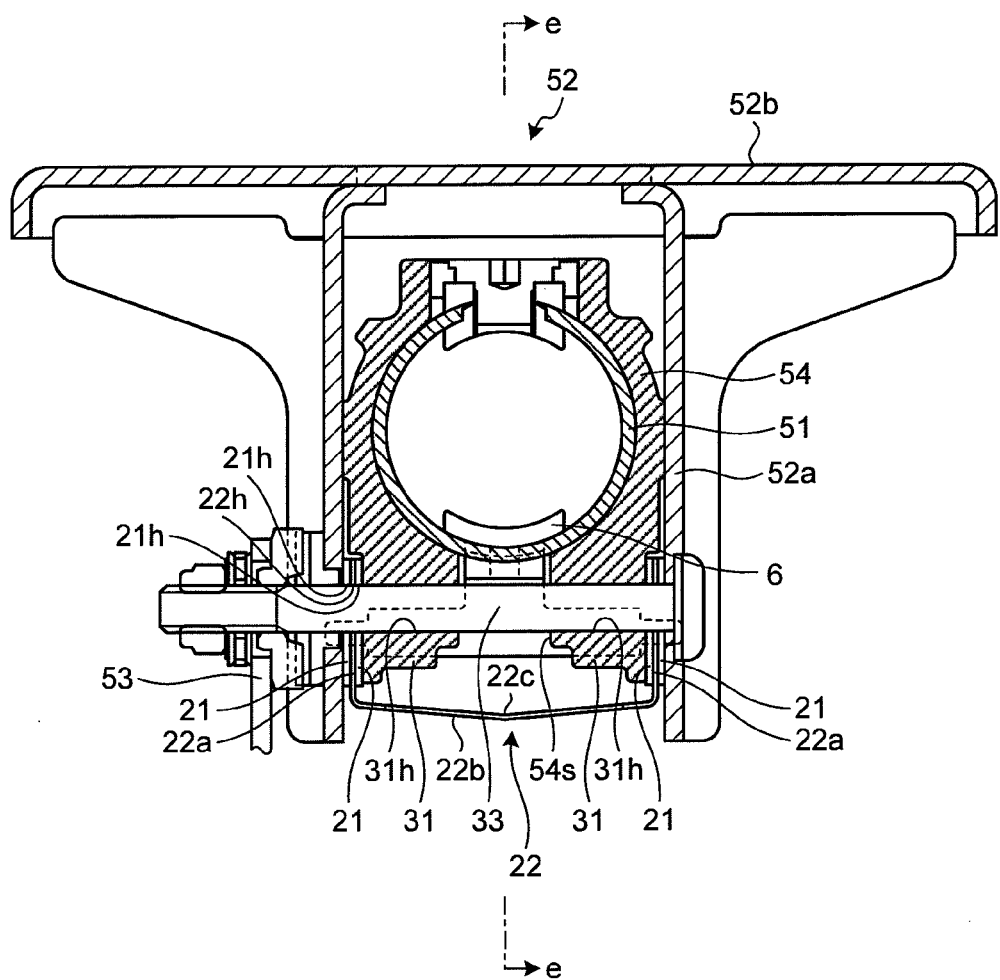
FIG. 26 is a cross-sectional view taken along the line d-d of FIG. 24.
Figure 27:
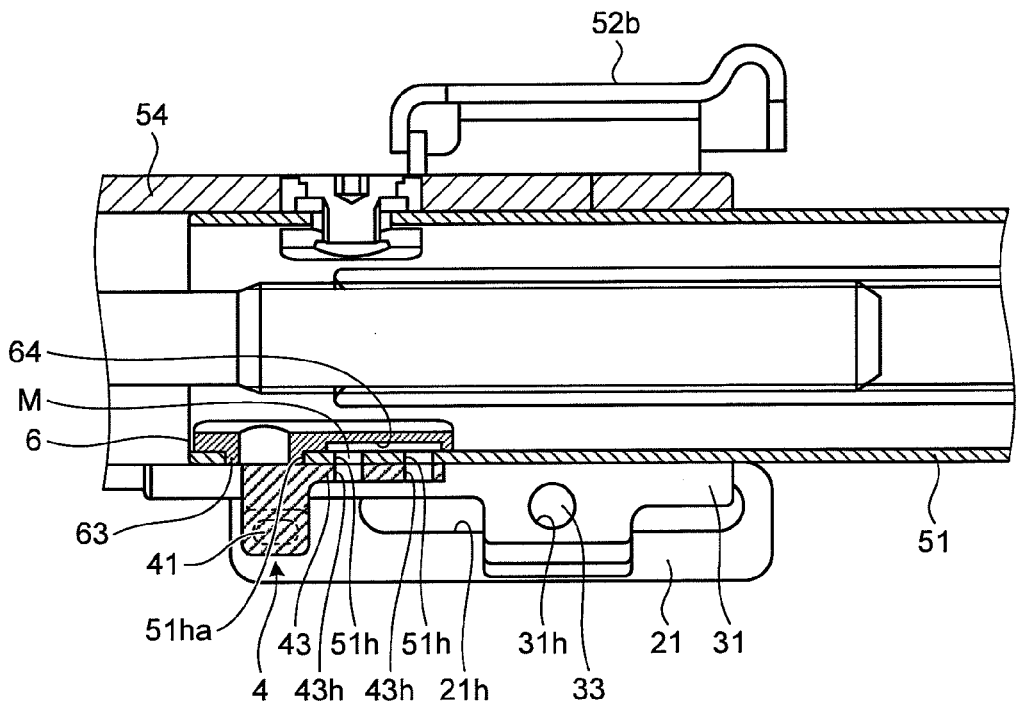
FIG. 27 is a cross-sectional view taken along the line e-e of FIG. 26.
Figure 28:
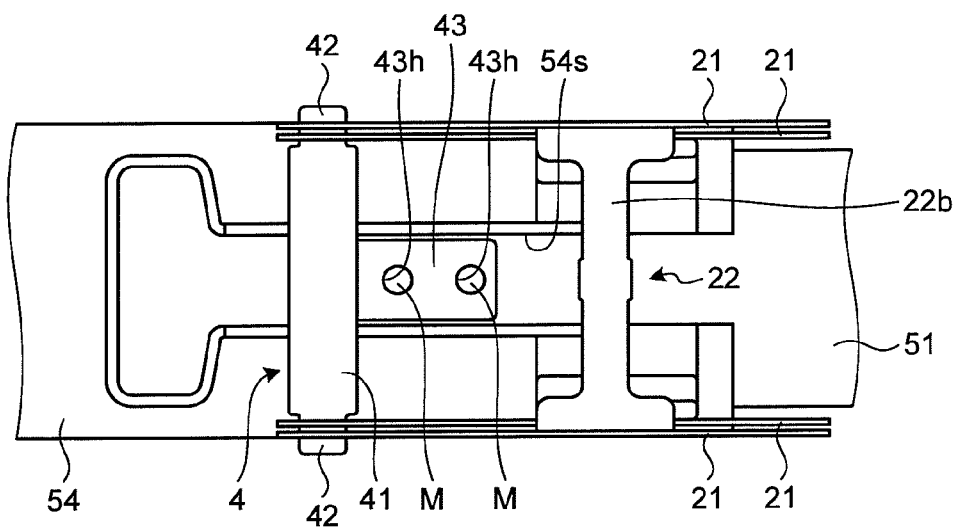
FIG. 28 is a diagram illustrating the bottom surface of the steering device according to the fifth embodiment.

FIG. 26 is a cross-sectional view taken along the line d-d of FIG. 24. FIG. 27 is a cross-sectional view taken along the line e-e of FIG. 26. FIG. 28 is a diagram illustrating the bottom surface of the steering device according to the fifth embodiment. As illustrated in FIG. 26, the outer column 54 includes two rod penetration holes 31 and a slit 54s. The rod penetration hole 31 is a portion which is projected outward in the radial direction from the outer periphery surface of the inner column 51, and includes a rod penetration hole 31h as an annular hole as illustrated in FIG. 27. The radial direction indicates a direction perpendicular to the axial direction, and is used as the same meaning in the description below. The rod penetration holes 31h of two rod penetration holes 31 face each other in the radial direction. Further, a part of the rod penetration hole 31 faces the frame-shaped support portion 52a. A rod 33 is connected to a manipulation lever 53 while penetrating two rod penetration holes 31h and the tilt adjustment hole 23h of the frame-shaped support portion 52a.

Further, the slit 54s is an elongated hole which is formed by notching one insertion side end of the inner column 51, and is provided in the outer wall of the outer column 54 at a position between two rod penetration holes 31. Since the outer column 54 includes the slit 54s, the inner diameter decreases when the outer column is tightened. Accordingly, in a state where the outer column 54 is tightened, the outer column 54 is located at a portion covering the inner column 51, and the inner periphery surface of the outer column 54 contacts the outer periphery surface of the inner column 51. For this reason, a friction force is generated between the outer column 54 and the inner column 51. Further, both ends of the slit 54s in the axial direction may be blocked. That is, the slit 54s may be a closed structure.

As illustrated in FIG. 26, the steering device 100 includes a first telescopic friction plate 21 and a second telescopic friction plate 22. The first telescopic friction plate 21 is a plate-shaped member that includes a telescopic adjustment hole 21h as an elongated hole which is long in the axial direction. For example, two first telescopic friction plates 21 are disposed between the frame-shaped support portion 52a and the rod penetration hole 31 in an overlapping state. The second telescopic friction plate 22 is, for example, a member that is formed by bending a plate material, and substantially has a U-shape when viewed from the axial direction. The second telescopic friction plate 22 includes two friction portions 22a which are disposed between two first telescopic friction plates 21, a connection portion 22b which connects two friction portions 22a, and a curved portion 22c which is provided in the connection portion 22b. In addition, the first telescopic friction plate 21 may not be essentially disposed between the frame-shaped support portion 52a and the rod penetration hole 31, and may be disposed with the frame-shaped support portion 52a interposed between the first telescopic friction plate 21 and the rod penetration hole 31.

The friction portion 22a includes a rod penetration hole 22h as an annular hole. The rod 33 penetrates the telescopic adjustment hole 21h and the rod penetration hole 22h. Since the connection portion 22b integrally connects two friction portions 22a, the friction portions 22a are facilely disposed between two first telescopic friction plates 21. Further, the connection portion 22b is maintained in a droopy state due to the curved portion 22c. Accordingly, the connection portion 22b may not easily pull the friction portions 22a even when the tightening state of the outer column bracket 52 changes so that the distance between two friction portions 22a changes. For this reason, it is possible to suppress a problem in which the friction portions 22a are pulled by the connection portion 22b so that a gap is formed between the friction portion 22a and the first telescopic friction plate 21.

When the frame-shaped support portion 52a is tightened, the first telescopic friction plate 21 and the friction portion 22a of the second telescopic friction plate 22 are pressed against the rod penetration hole 31 on the outer column 54 by the frame-shaped support portion 52a. Accordingly, a friction force is generated between the frame-shaped support portion 52a and the first telescopic friction plate 21, a friction force is generated between the first telescopic friction plate 21 and the friction portion 22a of the second telescopic friction plate 22, and a friction force is generated between the first telescopic friction plate 21 and the rod penetration hole 31. For this reason, the surface area causing a friction force increases compared to the case where the first telescopic friction plate 21 and the second telescopic friction plate 22 are not provided. The frame-shaped support portion 52a tightens the outer column 54 more strongly by the first telescopic friction plate 21 and the second telescopic friction plate 22.

Further, when the manipulation lever 53 is rotated, the tightening force for the frame-shaped support portion 52a is loosened, and the friction force between the frame-shaped support portion 52a and the outer column 54 disappears or decreases. Accordingly, the tilt position of the outer column 54 is adjusted. Further, when the manipulation lever 53 is rotated, the tightening force for the frame-shaped support portion 52a is loosened, and hence the width of the slit 54s of the outer column 54 increases. Accordingly, since the force in which the outer column 54 tightens the inner column 51 disappears, the friction force caused by the sliding of the inner column 51 disappears. Accordingly, an operator can adjust the telescopic position by pressing and pulling the inner column 51 through the steering wheel 81 after rotating the manipulation lever 53.

Figure 29:
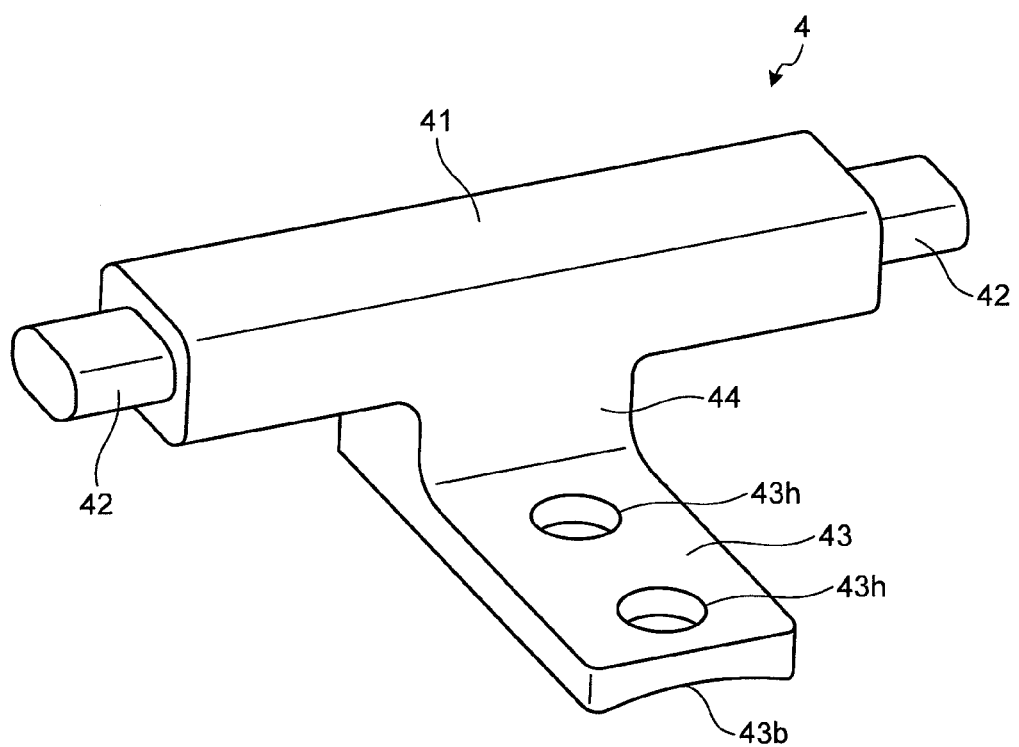
FIG. 29 is a perspective view illustrating an inner column bracket according to the fifth embodiment.

As illustrated in FIGS. 27 and 28, the steering device 100 includes an inner column bracket 4. FIG. 29 is a perspective view illustrating an inner column bracket according to the fifth embodiment. As illustrated in FIG. 29, the inner column bracket 4 includes, for example, an arm portion 41, an insertion portion 42, a neck portion 44, and a leg portion 43. For example, as illustrated in FIG. 28, the arm portion 41 is a rod-shaped portion which connects two first telescopic friction plates 21 facing each other at both sides of the outer column 54. The insertion portion 42 is a portion which is formed at both ends of the arm portion 41 and is inserted into a hole formed in the first telescopic friction plate 21. The insertion portion 42 is thinner than the arm portion 41. The neck portion 44 is a portion which is projected from a part of the arm portion 41 in a direction perpendicular to the length direction of the arm portion 41. The leg portion 43, which is provided in the end opposite to the arm portion 41 of the neck portion 44, is a plate-shaped portion and contacts the inner column 51. As illustrated in FIG. 29, an inner column side surface 43b of the leg portion 43 is formed in a shape that follows the shape of the outer wall of the inner column 51.

As illustrated in FIG. 28, the inner column bracket 4 is connected to the first telescopic friction plates 21 disposed at both sides of the outer column 54. The inner column bracket 4 is supported by the first telescopic friction plate 21 in a manner such that the insertion portion 42 is inserted into a hole formed in the first telescopic friction plate 21. Further, the first telescopic friction plates 21 which are disposed at both sides of the outer column 54 face each other with the arm portion 41 of the inner column bracket 4 interposed therebetween. Further, the inner column bracket 4 is connected to the inner column 51 by the leg portion 43.

In order to detachably connect the inner column bracket 4 and the inner column 51 to each other, as illustrated in FIG. 27, a first hole 51h is opened in the inner column 51 and a second hole 43h is opened in the leg portion 43. The first hole 51h and the second hole 43h communicate with each other. For example, in the fifth embodiment, two first holes 51h and two second holes 43h are respectively provided. When the connection member M is inserted into a position straddling the first hole 51h and the second hole 43h, the leg portion 43 of the inner column bracket 4 and the inner column 51 are detachably connected to each other. Further, the first telescopic friction plates 21 are respectively disposed at both sides of the outer column 54, and the first hole 51h and the second hole 43h are disposed at a position where the distance values from each of the first telescopic friction plates 21 are equal to each other.

Further, the inner column bracket 4 is disposed so that at least a part thereof is inserted into the slit 54s of the outer column 54. Specifically, the leg portion 43 of the inner column bracket 4 is inserted so as to face the inner wall of the slit 54s.

In the fifth embodiment, the connection member M is a resinous member and is formed of, for example, polyacetal. When the connection member M as the resinous member is injected and solidified at a position straddling the first hole 51h and the second hole 43h, the leg portion 43 of the inner column bracket 4 and the inner column 51 are connected to each other.

Figure 30:
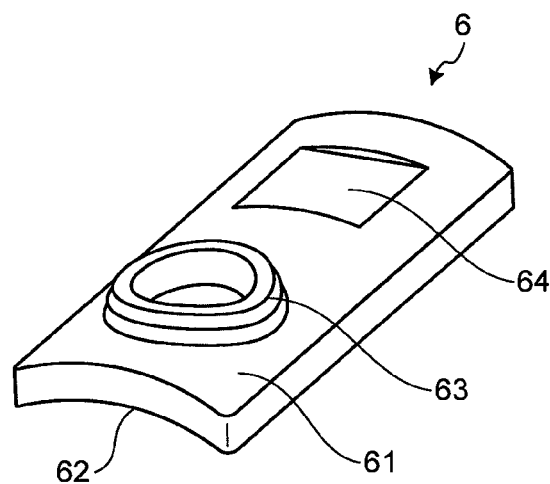
FIG. 30 is a perspective view illustrating an inner plate according to the fifth embodiment when viewed from a shielding surface.
Figure 31:
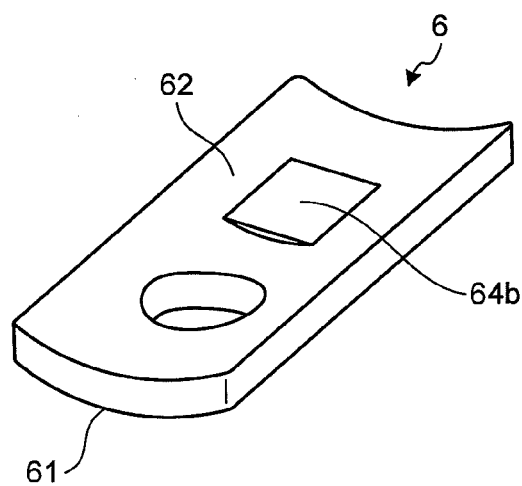
FIG. 31 is a perspective view illustrating the inner plate according to the fifth embodiment when viewed from a rear surface.

FIG. 30 is a perspective view illustrating an inner plate according to the fifth embodiment when viewed from a shielding surface. FIG. 31 is a perspective view illustrating the inner plate according to the fifth embodiment when viewed from a rear surface. The steering device 100 includes an inner plate 6 in the inner periphery surface of the inner column 51 so that the connection member M injected into the first hole 51h and the second hole 43h does not flow to the inside of the inner column 51. The inner plate 6 is, for example, a plate-shaped member having a shape following the shape of the inner periphery surface of the inner column 51. The inner plate 6 is provided in the inner periphery surface of the inner column 51 and covers the inside of the first hole 51h. The inner plate 6 includes a protrusion portion 63 and a concave portion 64 in a shielding surface 61 facing the inner periphery surface of the inner column 51.

The protrusion portion 63 bulges in, for example, an annular shape in a direction perpendicular to the shielding surface 61. For example, the inside of the portion which bulges in an annular shape is formed as a hole that pierces toward a rear surface 62. As illustrated in FIG. 27, the protrusion portion 63 is inserted in a fitting hole 51ha provided in the inner column 51. For example, the inner plate 6 is fixed to the inner column 51 in a manner such that the protrusion portion 63 is swaged to the fitting hole 51ha. In addition, the inner plate 6 may be fixed to the inner column 51 in a manner such that the protrusion portion 63 is press-inserted into the fitting hole 51ha.

The concave portion 64 is formed by, for example, a pressing work. Consequently, as illustrated in FIG. 31, a protrusion portion 64b is formed at the rear side of the concave portion 64. The concave portion 64 is arranged at a position facing the first hole 51h as illustrated in FIG. 27. In the fifth embodiment, the concave portion 64 is provided at one position so as to face two first holes 51h. Accordingly, the concave portion 64 causes two first holes 51h to communicate with each other.

When the inner column bracket 4 and the inner column 51 are connected to each other, the connection member M is injected from the second hole 43h while the concave portion 64 faces two first holes 51h. The connection member M, which is injected from the second hole 43h, is injected into the second hole 43h, the first hole 51h, and the concave portion 64 and then solidified. Accordingly, since the connection member M solidified in the concave portion 64 prevents the connection member M from coming off, it is possible to suppress a problem in which the connection member M comes off from the first hole 51h and the second hole 43h.

Further, for example, the connection member M is injected so as to come out of the concave portion 64. Since the connection member M comes out of the concave portion 64, a gap between the shielding surface 61 of the inner plate 6 and the inner column 51 is filled by the connection member M. Accordingly, the play of the inner plate 6 is suppressed.

Further, a state where the connection member M comes out of the concave portion 64 is visually checked from the end surface of the inner column 51. For this reason, it is possible to more reliably check a state where the connection member M is injected by a predetermined amount or more. In addition, in order to easily visually check a state where the connection member M comes out of the concave portion 64, the inner column 51 may be formed so that a visual checking slit is provided at a portion facing the rear surface 62 of the inner plate 6 or the vicinity thereof.

When an excessive load is applied to the steering wheel 81, the load is transmitted to the inner column 51 through the input shaft 82a, and the inner column 51 is moved forward. Meanwhile, the inner column bracket 4 which is supported by the first telescopic friction plate 21 does not move. For this reason, since a shearing force is applied to the connection member M, the connection member M is cut when the load exceeds the allowable shearing force of the connection member M. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and thus impact is absorbed.

Further, even when the connection member M is cut, the outer column 54 is supported by the outer column bracket 52 which is fixed to the vehicle body side member 13. Further, the inner column 51 is supported by the outer column 54.

Consequently, even when the connection member M is cut, the steering column 50 does not drop.

Further, it is desirable that the inner column 51 move straightly in the axial direction after the connection member M is cut. When the movement direction of the inner column 51 forms an angle with respect to the axial direction of the outer column 54, the movement of the inner column 51 is apt to be disturbed or a friction force generated between the inner column 51 and the outer column 54 becomes larger than a predetermined value.

In the fifth embodiment, as illustrated in FIG. 28, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. As a result, it is possible to stabilize the posture of the inner column bracket 4 when the connection member M is cut. Thus, the posture of the inner column 51, when the inner column starts to move, is easily maintained so as to be straight in the axial direction. Accordingly, the inner column 51 moves easily straightly in the axial direction.

Further, the first hole 51$h$ and the second hole 43$h$ are disposed at a position where the distance values from the first telescopic friction plates 21 disposed at both sides with the inner column bracket 4 interposed therebetween are equal to each other. Accordingly, when an axial load is applied to the inner column bracket 4, a tightening force is more equally applied from both sides of the outer column 54 to the inner column bracket 4. Accordingly, it is possible to stabilize the posture of the inner column bracket 4 when the connection member M is cut. Thus, it is possible to easily maintain the posture in which the inner column 51 starts to move so as to be straighter in the axial direction. Thus, the inner column 51 is likely to move straight in the axial direction.

Further, even when the inner column bracket 4 may not receive a tightening force equally from both sides of the outer column 54, since the leg portion 43 of the inner column bracket 4 is inserted into the slit so as to face the inner wall of the slit 54$s$, the inner column bracket 4 is guided by the slit 54$s$. Accordingly, it is possible to stabilize the posture of the inner column bracket 4 when the connection member M is cut.

In addition, the allowable shearing force of the connection member M is adjusted by changing the number of the first holes 51$h$ and the second holes 43$h$, the cross-sectional areas of the first hole 51$h$ and the second hole 43$h$, and the material of the connection member M. For example, a number of set of the first hole 51$h$ and the second hole 43$h$ is either one of one or three or more. Further, the connection member M may be formed of, for example, metal including non-ferrous metal, an adhesive, or rubber.

Figure 32:
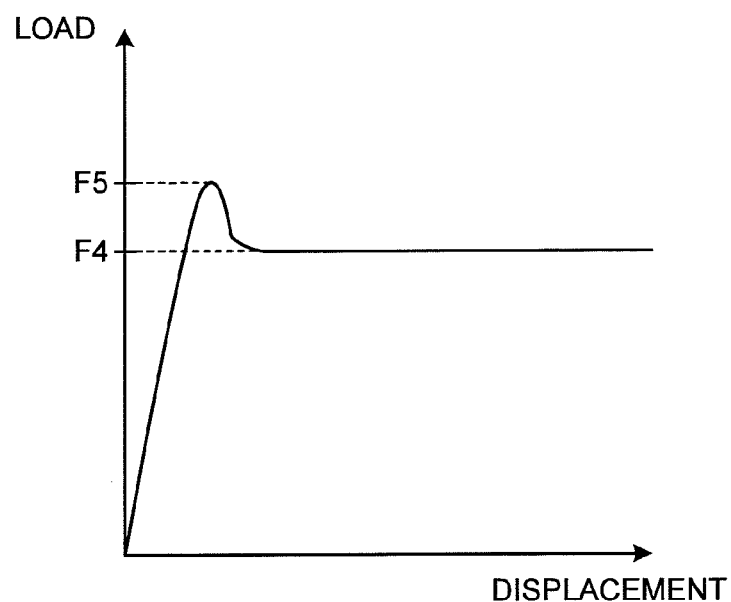
FIG. 32 is a diagram illustrating a relation between a displacement amount of a steering column and a load necessary to move the steering column of a comparative example.
Figure 33:
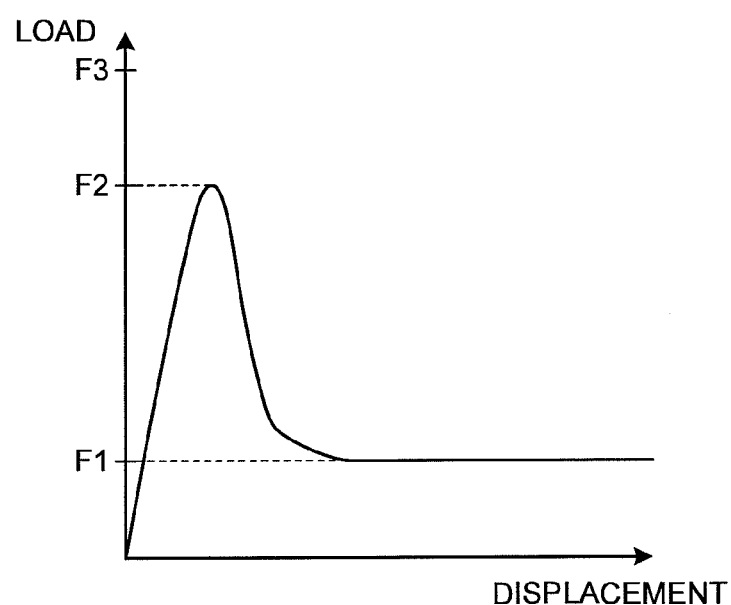
FIG. 33 is a diagram illustrating a relation between a displacement amount of a steering column and a load necessary to move the steering column of the fifth embodiment.

FIG. 32 is a diagram illustrating a relation between a displacement amount of a steering column and a load necessary to move the steering column of a comparative example. FIG. 33 is a diagram illustrating a relation between a displacement amount of the steering column and a load necessary to move the steering column of the fifth embodiment. In FIGS. 32 and 33, the horizontal axis indicates the forward displacement amount of the steering column, and the vertical axis indicates the load necessary to move the steering column forward.

The comparative example is an example in the case where the outer column is attached to the vehicle body through the capsule as in the technique disclosed in Prior Art 1. In the comparative example, the outer column is disposed at the rear side in relation to the inner column. Then, when an excessive load is applied to the outer column, the rod contacts the end of the telescopic adjustment hole integrated with the outer column, and then the load is transmitted to the capsule through the bracket. A force F5 illustrated in FIG. 32 indicates the allowable shearing force of the capsule.

In the comparative example, the outer column is supported in the axial direction by a friction force generated between the inner column and the outer column due to the tightening of the bracket. A force F4 illustrated in FIG. 32 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut and the outer column is separated from the vehicle body. Subsequently, the outer column moves in the axial direction while absorbing an impact by a friction force with respect to the inner column. However, since the force F4 is maintained at a predetermined value or more as described above, the outer column moves smoothly, and hence the operator may not be easily protected from the secondary collision.

Meanwhile, in the fifth embodiment, the inner column 51 is supported in the axial direction by a first friction force, which is generated between the inner column 51 and the outer column 54 by the tightening of the outer column bracket 52, and a second friction force, which is generated between the first telescopic friction plate 21 and the member (the outer column bracket 52, the second telescopic friction plate 22, and the outer column 54) contacting the first telescopic friction plate 21. The force F1 illustrated in FIG. 33 indicates the first friction force, and the force F3 indicates the sum of the first friction force and the second friction force. Further, the force F2 illustrated in FIG. 33 indicates the allowable shearing force of the connection member M. The force F2 is smaller than the force F3 and is larger than the force F1.

In the fifth embodiment, when a load of the force F2 or more is applied to the inner column 51, the connection member M is cut and the inner column 51 is separated from the inner column bracket 4. Accordingly, since the connection between the inner column 51 and the first telescopic friction plate 21 is released, the second friction force is not applied to the inner column 51. For this reason, the inner column 51 moves in the axial direction while absorbing an impact by the first friction force after the connection member M is cut. In the steering device 100 according to the fifth embodiment, when the first friction force is set to be small, the inner column 51 moves smoothly, and thus the operator may be protected from a secondary collision.

In the fifth embodiment, even when the setting value of the first friction force is small, the second friction force compensates a degree in which the first friction force decreases among the force supporting the inner column 51 in the axial direction. For this reason, since the steering device 100 according to the fifth embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the fifth embodiment includes the cylindrical inner column 51, which rotatably supports the input shaft 82$a$ connected to the steering wheel 81 and has the first hole 51$h$ opened therein, and the outer column 54, which is formed in a cylindrical shape for inserting at least a part of the inner column 51 thereinto and has the slit 54s formed by notching at an end where the inner column 51 is inserted. Further, the steering device 100 includes the outer column bracket 52 which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4 which is supported by the telescopic friction plate (the first telescopic friction plate 21) and has the second hole 43h opened thereon. Further, the steering device 100 includes the connection member M which detachably connects the inner column 51 and the inner column bracket 4 to each other at a position straddling the first hole 51h and the second hole 43h. The telescopic friction plate (the first telescopic friction plate 21) is disposed at both sides of the outer column 54. Further, the steering device 100 includes the inner plate 6 which is provided in the inner periphery surface of the inner column 51 and covers the inside of the first hole 51h.

Accordingly, in the steering device 100 according to the fifth embodiment, since the connection member M as the resinous member is injected in a state where the inside of the first hole 51h is covered by the inner plate 6, and the inner column 51 and the inner column bracket 4 are facilely connected to each other. Further, in the steering device 100 according to the fifth embodiment, when an excessive load is applied to the steering wheel 81, the load is transmitted to the inner column 51 through the input shaft 82a so as to move the inner column 51 forward. Meanwhile, the inner column bracket 4 which is supported by the first telescopic friction plate 21 does not move. Consequently, since a shearing force is applied to the connection member M, the connection member M is cut when the load exceeds the allowable shearing force of the connection member M. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 moves toward the front side of the vehicle body. Further, even when the connection member M is cut, the outer column 54 is supported by the outer column bracket 52 fixed to the vehicle body side member 13. Further, the inner column 51 is supported by the outer column 54. For this reason, even when the connection member M is cut, the steering column 50 does not drop. Thus, the steering device 100 according to the fifth embodiment prevents a problem in which the steering column 50 is dropped by the erroneous operation even when decreasing the setting value (the allowable shearing force of the connection member M) of the separation load in which the steering column 50 moves toward the front side of the vehicle body.

Further, in the steering device 100 according to the fifth embodiment, the inner plate 6 includes a concave portion 64 at a position facing the first hole 51h. The connection member M is injected into the first hole 51h, the second hole 43h, and the concave portion 64. Accordingly, since the connection member M solidified in the concave portion 64 functions as the prevention of coming off, the steering device 100 according to the fifth embodiment can suppress a problem in which the connection member M comes off from the first hole 51h and the second hole 43h.

Modified Example of Fifth Embodiment

Figure 34:
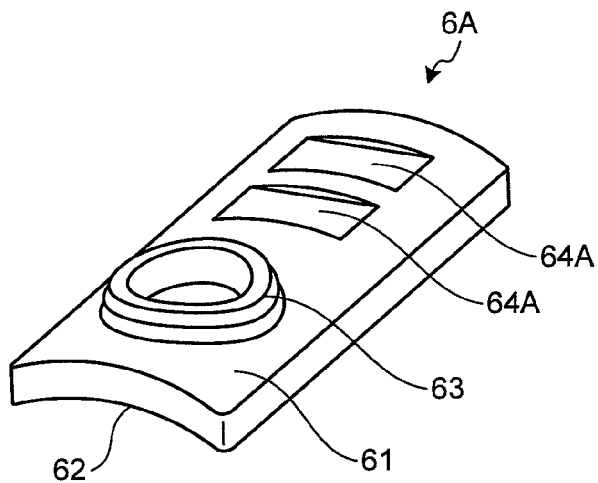
FIG. 34 is a perspective view illustrating an inner plate according to a modified example of the fifth embodiment when viewed from a shielding surface.
Figure 35:
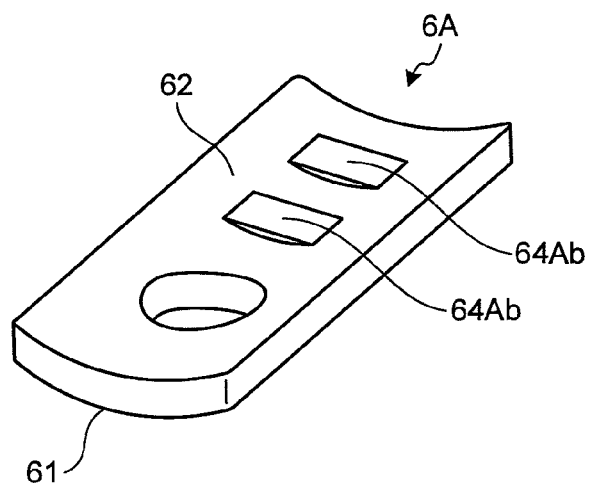
FIG. 35 is a perspective view illustrating the inner plate according to the modified example of the fifth embodiment when viewed from a rear surface.

FIG. 34 is a perspective view illustrating an inner plate according to a modified example of the fifth embodiment when viewed from a shielding surface. FIG. 35 is a perspective view illustrating the inner plate according to the modified example of the fifth embodiment when viewed from a rear surface. The modified example of the fifth embodiment is different from the fifth embodiment in that the inner plate has a different configuration. In addition, the same reference signs will be given to the same components as those of the above-described embodiments, and the repetitive description thereof will not be presented.

The steering device 100 according to the modified example of the fifth embodiment includes an inner plate 6A in the inner periphery surface of the inner column 51 so that the connection member M injected in the first hole 51h and the second hole 43h does not flow to the inside of the inner column 51. The inner plate 6A is, for example, a plate-shaped member that has a shape following the shape of the inner periphery surface of the inner column 51. The inner plate 6A includes the protrusion portion 63 and two concave portions 64A in the shielding surface 61 facing the inner periphery surface of the inner column 51.

The concave portion 64A is formed by, for example, a pressing work. For this reason, as illustrated in FIG. 35, a protrusion portion 64Ab is formed at the rear side of the concave portion 64A. Two concave portions 64A are disposed maintaining a predetermined distance therebetween. One concave portion 64A faces one first hole 51h. Specifically, the number of the concave portion 64A is not necessary two positions. The number of the concave portion 64A is as many as the number of the first hole 51h.

When the inner column bracket 4 and the inner column 51 are connected to each other, the concave portion 64A is arranged to face the first hole 51h, and the connection member M is injected from the second hole 43h. The connection member M, which is injected from the second hole 43h, is injected into the second hole 43h, the first hole 51h, and the concave portion 64A and then solidified. Accordingly, since the connection member M solidified in the concave portion 64A prevents the connection member M from coming off, it is possible to suppress a problem in which the connection member M comes off from the first hole 51h and the second hole 43h.

Further, in the modified example of the fifth embodiment, since two concave portions 64A do not communicate with each other, a communication space using the second hole 43h, the first hole 51h, and the concave portion 64A becomes smaller than that of the fifth embodiment. For this reason, since the injected connection member M is facilely solidified, the inner column bracket 4 and the inner column 51 are more reliably connected to each other.

Further, in the fifth embodiment, the connection members M that are injected from two different second holes 43h meet together at the concave portion 64. For this reason, there is a concern that the connection members M meeting together at the concave portion 64 are integrated and prevent the connection member M from being solidified facilely. On the contrary, when the inner plate 6A according to the modified example of the fifth embodiment is used, the connection members M that are injected from two different second holes 43h respectively flow into different concave portions 64A, and thus the connection members M are solidified in the concave portions 64A more reliably.

As described above, in the steering device 100 according to the modified example of the fifth embodiment, a plurality of the first holes 51*h* and the concave portions 64A is provided, such that one concave portion 64A faces one first hole 51*h*. Accordingly, since each of the concave portions 64A does not communicate with the other one of the concave portions 64A, a communication space of the second hole 43*h*, the first hole 51*h*, and the concave portion 64A becomes smaller than that of the fifth embodiment. For this reason, since the injected connection member M is facilely solidified, the steering device 100 according to the modified example of the fifth embodiment connect the inner column bracket 4 and the inner column 51 to each other more reliably.

Sixth Embodiment

Figure 36:
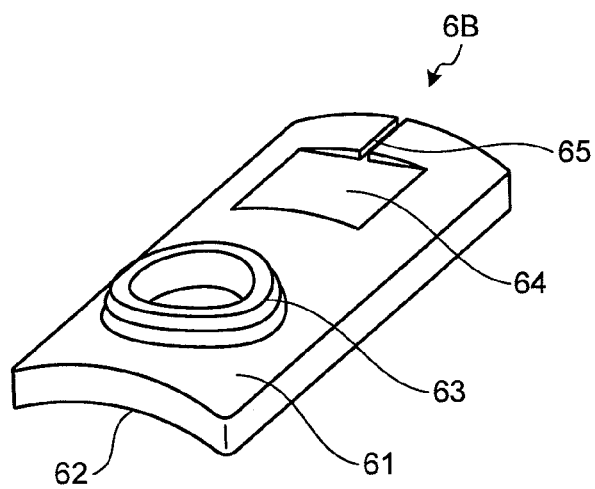
FIG. 36 is a perspective view illustrating the inner plate according to the sixth embodiment when viewed from a shielding surface.
Figure 37:
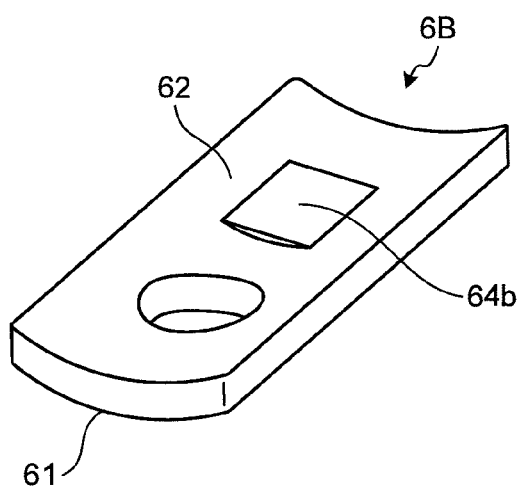
FIG. 37 is a perspective view illustrating the inner plate according to the sixth embodiment when viewed from a rear surface.

FIG. 36 is a perspective view illustrating an inner plate according to a sixth embodiment when viewed from a shielding surface. FIG. 37 is a perspective view illustrating the inner plate according to the sixth embodiment when viewed from a rear surface. In addition, the same reference signs will be given to the same components as those of the above-described embodiments, and the repetitive description thereof will not be presented.

The steering device 100 includes an inner plate 6B in the inner periphery surface of the inner column 51 so that the connection member M injected into the first hole 51*h* and the second hole 43*h* does not flow to the inside of the inner column 51. The inner plate 6B is, for example, a plate-shaped member that has a shape following the shape of the inner periphery surface of the inner column 51. The inner plate 6B is provided in the inner periphery surface of the inner column 51 and covers the inside of the first hole 51*h*. The inner plate 6B includes a protrusion portion 63 and a concave portion 64 in the shielding surface 61 facing the inner periphery surface of the inner column 51.

For example the connection member M is injected so as to flow out of the concave portion 64. Since the connection member M flows out of the concave portion 64, a gap between the shielding surface 61 of the inner plate 6B and the inner column 51 is filled by the connection member M. Accordingly, the play of the inner plate 6B is suppressed. Further, as illustrated in FIG. 36, a connection member runner groove 65 is formed on the shielding surface 61 of the inner plate 6B outward in the axial direction from the concave portion 64 so that the connection member M flows outward while being injected thereinto. By the connection member runner groove 65, the connection member M, which is injected once into the concave portion 64, remains in the concave portion 64 and extends to every corner. Then, the connection member runs or flows outward from the outermost end of the concave portion 64 by the injection pressure. Thus, the connection member M flows to every corner of the concave portion 64, and hence the play of the inner plate 6B disappears. Accordingly, it is possible to reliably suppress a problem in which the connection member M comes off from the first hole 51*h* and the second hole 43*h*.

Further, a state where the connection member M flows out of the concave portion 64 is visually checked from the end surface of the inner column 51. For this reason, it is possible to more reliably check a state where the connection member M is injected by a predetermined amount or more. In addition, in order to more easily check a state where the connection member M flows out of the concave portion 64, the inner column 51 is formed so that a visual checking slit is provided in a portion facing the rear surface 62 of the inner plate 6B or the vicinity thereof.

Seventh Embodiment

Figure 38:
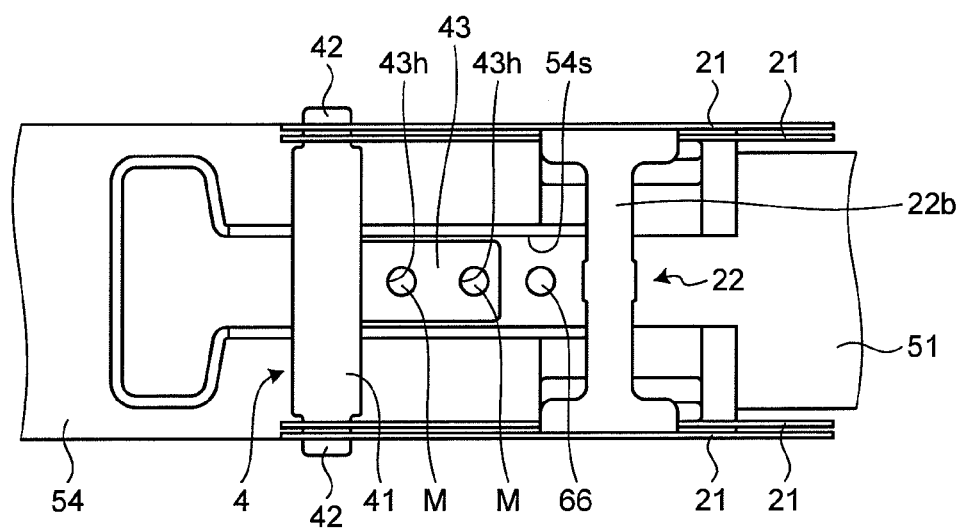
FIG. 38 is a diagram illustrating a bottom surface of a steering device according to a seventh embodiment.

FIG. 38 is a diagram illustrating a bottom surface of a steering device according to a seventh embodiment. In addition, the same reference signs will be given to the same components as those of the above-described embodiments, and the repetitive description thereof will not be presented.

In order to check a state where the connection member M flows out of the concave portion 64, a checking hole 66 is provided near the first hole 51*h* and the second hole 43*h* of the inner column 51. Specifically, as illustrated in FIG. 38, the checking hole 66 is provided on the extension line facing the outside of the connection member runner groove 65. Thus, it is possible to simply and reliably check a state where the connection member M flows out from the concave portion 64. Further, since it is possible to suppress the amount in which the connection member M flows out as small as possible, it is possible to improve an efficiency of the injection production type and to realize a stable production. In addition, in order to more easily check a state where the connection member M flows out of the concave portion 64, the inner column 51 is formed so that a visual checking slit is provided in a portion facing the rear surface 62 of the inner plate 6 or the vicinity thereof.

REFERENCE SIGNS LIST 12, 13 VEHICLE BODY SIDE MEMBER
21 FIRST TELESCOPIC FRICTION PLATE
21*h* TELESCOPIC ADJUSTMENT HOLE
22 SECOND TELESCOPIC FRICTION PLATE
22*a* FRICTION PORTION
22*b* CONNECTION PORTION
22*c* CURVED PORTION
22*h* ROD PENETRATION HOLE
23*h* TILT ADJUSTMENT HOLE
31 ROD PENETRATION HOLE
31*h* ROD PENETRATION HOLE
33 ROD
4 INNER COLUMN BRACKET
41 ARM PORTION
42 INSERTION PORTION
43 LEG PORTION
43*b* INNER COLUMN SIDE SURFACE
43*h* SECOND HOLE
44 NECK PORTION
50 STEERING COLUMN
51 INNER COLUMN
51*h* FIRST HOLE
51*ha* FITTING HOLE
52 OUTER COLUMN BRACKET
52*a* FRAME-SHAPED SUPPORT PORTION
52*b* ATTACHMENT PLATE PORTION
52*h* ATTACHMENT HOLE
53 MANIPULATION LEVER
54 OUTER COLUMN
54*s* SLIT
55 PIVOT BRACKET
55*a* ROTATION SHAFT
6 INNER PLATE
61 SHIELDING SURFACE
62 REAR SURFACE
63 PROTRUSION PORTION
64, 64A CONCAVE PORTION

64Ab PROTRUSION PORTION
65 CONNECTION MEMBER RUNNER GROOVE
66 CHECKING HOLE
81 STEERING WHEEL
82 STEERING SHAFT
82a INPUT SHAFT
82b OUTPUT SHAFT
84 UNIVERSAL JOINT
85 LOWER SHAFT
86 UNIVERSAL JOINT
87 PINION SHAFT
100 STEERING DEVICE
101 STEERING HANDLE
102 RACK HOUSING
103 PINION
104 TIE ROD
105 FEMALE STEERING SHAFT
106 MALE STEERING SHAFT
107 CROSS JOINT
108 INTERMEDIATE SHAFT
109 CROSS JOINT
110 STEERING DEVICE
120 STEERING COLUMN APPARATUS
121 INNER COLUMN
122 OUTER COLUMN
123 TILT BRACKET
1231 VEHICLE BODY MOUNTING SIDE BRACKET
1232 PRESSING BRACKET
124 FIXED BRACKET
125 TELESCOPIC MULTI-PLATE
126 TELESCOPIC MULTI-PLATE
127 TILT LEVER
128 TILT BOLT HOLE
129 TIGHTENING MECHANISM
130 MANIPULATION PORTION
131 ROLLING BEARING
132 TILT BOLT
133 CAM LOCK MECHANISM
134 NUT
135 ROLLING BEARING
136 SEPARATION PREVENTING MECHANISM
137 SHEAR PIN
138 SHEAR PIN
139 INNER COLUMN CONTACT SURFACE
140 SHEAR PIN HOLE
141 SHEAR PIN HOLE
142 FIXED PORTION
143 FIXED PORTION
144 TRANSVERSE BEAM PORTION
145 COLUMN PORTION
146 MOUNTING PORTION
147 DISTANCE BRACKET
148 CAM AND GEAR MECHANISM
149 SHEAR PIN
150 SHEAR PIN
151 MOVABLE GEAR LOCK
152 FIXED GEAR LOCK
153 TILT BOLT CENTER PORTION
154 CAM MECHANISM
155 ECCENTRIC CAM
156 PRESSING BLOCK
157 PRESSING BLOCK
158 INNER PLATE
159 CONCAVE PORTION
160 FITTING PROTRUSION
161 FITTING HOLE
162 INJECTION PORT
M CONNECTION MEMBER
VB VEHICLE BODY

The invention claimed is:

1. A steering device comprising:
an inner column having a cylindrical shape and a first hole opened therein, the inner column rotatably supporting an input shaft connected to a steering wheel;
an outer column having a cylindrical shape into which at least a part of the inner column is inserted and having a slit at one end thereof where the inner column is inserted;
an outer column bracket fixed to a vehicle body side member to support the outer column and to tighten the outer column along with a telescopic friction plate having a plate shape;
an inner column bracket having a second hole opened therein, the inner column supported by the telescopic friction plate;
a connection member that is a resinous member provided at a position straddling the first hole and the second hole and detachably connecting the inner column and the inner column bracket to each other; and
an inner plate that is provided in an inner periphery surface of the inner column and covers the inside of the first hole.

2. The steering device according to claim 1,
wherein the inner plate includes a concave portion at a position facing the first hole, and
wherein the connection member is injected into the first hole, the second hole, and the concave portion.

3. The steering device according to claim 2,
wherein a connection member runner groove is provided outward from the concave portion.

4. The steering device according to claim 1,
wherein a checking hole is opened in the inner column.

5. The steering device according to claim 2,
wherein the first hole and the concave portion are provided at a plurality of positions, and
wherein one concave portion faces one first hole.

6. The steering device according to claim 4
wherein the first hole and the concave portion are provided at a plurality of positions, and
wherein one concave portion faces one first hole.

* * * * *